United States Patent
Ramos

(10) Patent No.: US 12,530,695 B2
(45) Date of Patent: Jan. 20, 2026

(54) INTERACTIVE INSTRUCTIONAL SYSTEM

(71) Applicant: Ramon Ramos, San Antonio, TX (US)

(72) Inventor: Ramon Ramos, San Antonio, TX (US)

(*) Notice: Subject to any disclaimer, the term of this patent is extended or adjusted under 35 U.S.C. 154(b) by 27 days.

(21) Appl. No.: 18/621,373

(22) Filed: Mar. 29, 2024

(65) Prior Publication Data

US 2024/0330947 A1 Oct. 3, 2024

Related U.S. Application Data

(60) Provisional application No. 63/493,174, filed on Mar. 30, 2023.

(51) Int. Cl.
G06Q 30/015 (2023.01)
G06Q 30/018 (2023.01)

(52) U.S. Cl.
CPC ......... *G06Q 30/015* (2023.01); *G06Q 30/018* (2013.01)

(58) Field of Classification Search
CPC .............................................. G06Q 30/01–016
See application file for complete search history.

(56) References Cited

U.S. PATENT DOCUMENTS

| | | | |
|---|---|---|---|
| 2018/0191903 A1* | 7/2018 | Yokel | H04M 3/5232 |
| 2018/0276676 A1* | 9/2018 | Zafar | G06N 3/006 |
| 2019/0050239 A1* | 2/2019 | Caldwell | G06F 11/0793 |
| 2020/0160351 A1* | 5/2020 | Veggalam | H04M 3/5233 |
| 2024/0054299 A1* | 2/2024 | D'Penha | G06F 40/58 |

* cited by examiner

*Primary Examiner* — Jay Huang
(74) *Attorney, Agent, or Firm* — BOTKIN & HALL, LLP; Michael D. Marston

(57) ABSTRACT

A system that is a network for providing instructions to a user seeking assistance. The system has an uplinking device that is used to transmit information across a network. The uplinking device transfers visual and audio information. The system provides options for the user of the uplinking device to connect with internal support members that are a part of his own organization or connect with external support members that are not a part of the user's organization. Within those choices the user can decide whether to choose from a list of favorites or have a support member assigned based on information input into the uplinking device. The system chooses the best support member based on the input information. After a session with the support member, the user must provide a rating on the session before being allowed to begin another session.

12 Claims, 22 Drawing Sheets

INTERACTIVE INSTRUCTIONAL SYSTEM

CROSS-REFERENCE TO RELATED APPLICATIONS

This application claims the benefit of the U.S. patent Ser. No. 63/493,174, filed Mar. 30, 2023, which is incorporated herein by reference in its entirety.

BACKGROUND

Various professional tasks require a well-developed skill level that is often accomplished only after years of experience. This experience in certain professions is often developed under the close supervision of a more seasoned professional guiding a newer member of that profession. That guidance often occurs in person, but that is not always possible. It may be the case that more seasoned professionals are not in the same location as a professional needing guidance. It may also be the case that the knowledge needed to be conveyed is in such short supply that the professionals having a particular specialty are spread far and wide. There is a need for a system to provide guidance from one professional to another over distances.

SUMMARY OF THE INVENTION

The present invention is a network system that is for providing instructions to a user seeking assistance. The system has an uplinking device that is for sending visual and audio information across a network. The uplinking device connectable to a camera and a microphone. The uplinking device transmits visual information and audio information over the network. The user may input information regarding equipment on which the use is seeking assistance upon into the uplinking device and that information is transmitted over the network. The uplinking device has a menu that displays a choice for internal support or external support. Upon selection of the choice for internal support, the uplinking device provides a first option to proceed to linking up and a second option to choose an internal support member from a predetermined list of favorites. Upon choosing the first option after indicating internal support, the uplinking device links with an internal support member chosen by the system. The system uses an algorithm to determine a match to one of said internal support members by referring to a database including information about said internal support members and making said match by assessing information within said database and comparing said information within said database with said input information regarding said equipment. Upon choosing the second option after indicating internal support, the system requests an input from the user choosing one of the internal support members within the predetermined list of favorites. Upon the user choosing the one internal support member from the predetermined list, the system determines whether the one internal support member from the predetermined list is available. If the system determines that the internal support member from the predetermined list is not available, then the system requests the user chose another internal support member.

Upon indication of the choice for external support, the uplinking device provides a first option to proceed to linking up and a second option to choose an external support member from a predetermined list of favorites. Upon choosing the first option after indicating external support, the uplinking device links with an external support member chosen by the system. The system employs an algorithm to determine a match to one of the external support members by referring to a database including information about external support members and making the match by assessing the information within that database that includes information about the external support members and comparing that information within the database including information about the external support members with the information input regarding the equipment. Upon choosing the second option after indicating external support, the system requests an input from the user to choose one of the external support members within the predetermined list of favorites. Upon the user choosing that one external support member from the predetermined list the system determines whether that external support member is available or not. If that one chosen external support member is not available, the system directs the user to choose another external support member.

Upon linking up with the one support member, that one support member engaging in a session in which information is exchanged and the session being terminated after the exchange of information. Upon termination of the session the user is prompted to provide a rating of the support member who engaged in the session with the user. Upon the user providing the rating, the rating is stored in the database that corresponds to the that particular support member. The system calculates an average rating of that particular support member who was engaged in the session with the user. The system then compares the average rating of the support member who was engaged in the session with the suer to a predetermined value, and if that rating falls below a predetermined value, that support member is removed from the system.

DETAILED DESCRIPTION OF THE INVENTION

The present invention relates to a system 10 that is for providing instruction to a technician that will do work in a location that is remote to another individual that will provide instruction to the technician. The device operator 14 is the person who will be seeking and receiving instruction. As such, the device operator 14 is the end user of the system and that device operator 14 relies on the support of the system 10 to receive the instruction he needs. The person providing instruction to the device operator 14 will be either an internal support member (ISM) 16 or an external support member (ESM) 18. In some instances, ISM and ESM 16, 18 may be referred to as support members 16, 18. The distinction between the two is that an ISM 16 is a member of the same organization 22 of which the device operator 14 is a member and the ESM 18 is not. The ESM 18 may be a member of a national network, or an independent contractor that is outside of the organization 22 of which the device operator 14 is a member. The organization 22 that employs the device operator 14 may recruit and employ ESMs 18 and those may be considered independent contractors or the ESMs 18 may work for an entirely different entity. Generally, the organization 22 is regarded a user of the system 10 of the present invention along with its device operators.

Generally, the business model that works with the system 10 of this invention is a subscription-based model. The organization 22 to which the device operator 14 belongs will typically subscribe to a service that will provide support in the form of a network that is connected to computers facilitating individual transactions as well as storing data as will be described. The organization 22 may also be hereinafter referred to as the subscribing organization 22. This network will connect the device operator 14 to the support needed to obtain instructional assistance with particular problems that may be encountered during diagnosing/troubleshooting the device operator 14 may make. The system 10 of the present invention may be useful for any service industry that requires skilled labor to successfully diagnosing/troubleshooting. Some of the industries in which the present invention is particularly useful are skilled trades such as heating ventilation and air conditioning ("HVAC"), plumbing, automotive, medical, military and police applications, and many other trades and professional services.

Figure 1:
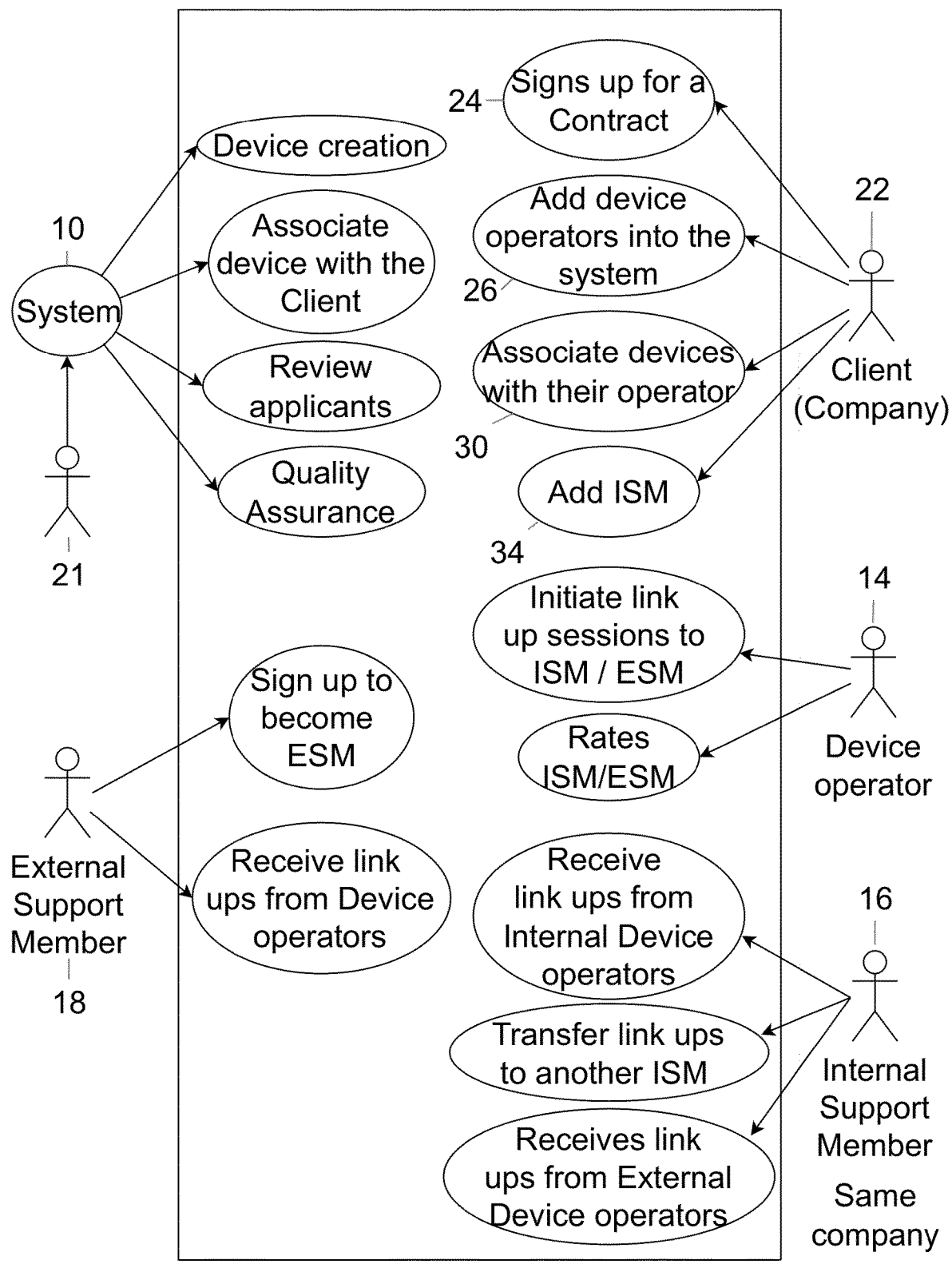
FIG. 1 is an overview of the system of the invention.
Figure 2:
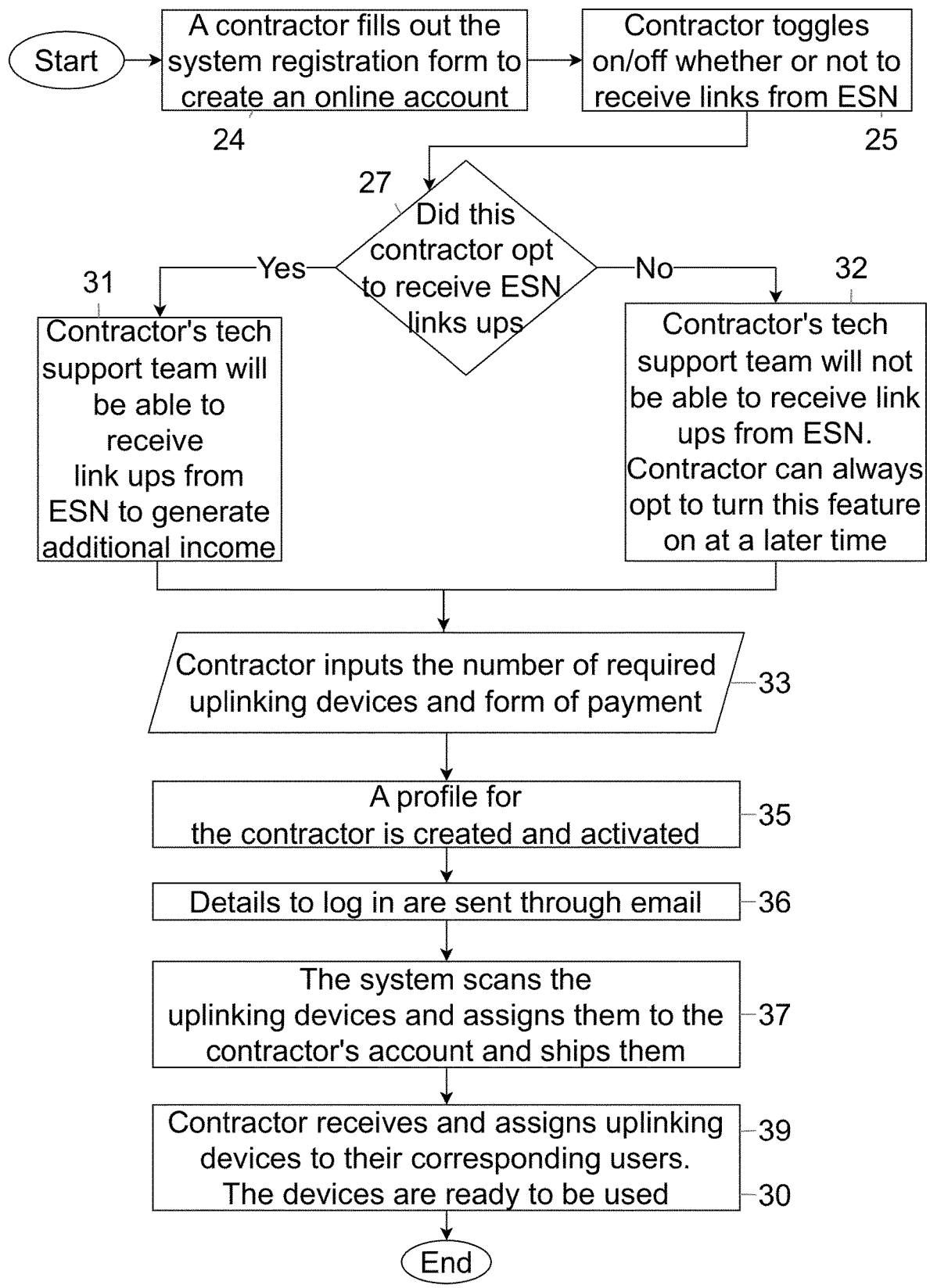
FIG. 2 is a flow diagram for setting up a contractor in the system of the invention.

FIG. 1 shows an overview of how the system 10 works in its initial stages. The subscribing organization 22 to which the device operator 14 belongs must sign a contract at step 24 with the company 21 that provides the system 10 of the present invention 10. The contract includes an end user license agreement that will contain certain provisions governing the conduct of the parties at both the subscribing organization 22 and the company 21 signing up for the service the system 10 provides. At times the company 21 may be hereinafter referred to as the providing company 21. This step consists of filling out necessary registration forms and creating an online account. FIG. 2 shows that at 25 the subscribing organization 22 signing up for the system 10 must make a choice to receive or not receive link up requests 220 from the external support network at steps 31 and 32. Box 27 on FIG. 2 shows how this choice provides organizational an organizational structure at box 31 where members of the subscribing organization 22 signing up for the system 10 may use its own employees to provide technical support for other entities. This activity will provide income for the subscribing organization 22 signing up for the system 10 because the subscribing organization 22 will be compensated for the technical support its own employees may provide to others. Choosing not to receive external network link ups at step 32 will preclude internal support members 16 in the subscribing organization 22 from being able to receive link up requests from the external support network and thereby also be an external support member 18 for providing support to another organization. The subscribing organization 22 is not required to use its own employees to provide external support to other organizations, as shown at box 32. The subscribing organization 22 signing up for the system 10 inputs the number of uplinking devices 28 it will need at box 33 in FIG. 2. These are the devices that the device operator 14 of the subscribing organization 22 will use to connect to the system 10 when in the field. The term uplinking device 28 may also be used interchangeably with "device 28" to mean the same piece of hardware that the device operator 14 uses in the field. The uplinking devices 28 will include an audio input such as a microphone, an output, and a camera. The microphone and camera may be externally connected to a separate component of the uplinking device 28 that makes a network connection. The network connection may be done via internet, WiFi, or over a cellular phone network. It is contemplated that the uplinking device 28 be a pair of glasses, hard hat, work light, or other devices that include a camera and a microphone that are connected to a separate unit housing a battery and a networking interface that is used to make a network connection with the system 10. A profile is created for the subscribing organization 22 and activated 35, then the details to log in are sent through email 36. The uplinking devices 28 are scanned by the company 21 providing the service and assigned to the subscribing organization's 22 account then shipped 37. The subscribing organization 22 receives the uplinking devices 28 at step 39 and assign the uplinking devices 28 to the corresponding device operator 14 within the subscribing organization 22 as described at 30.

As shown in FIG. 1, the organization 22 subscribing to the service adds its device operators 14 into the system at 26 and then associates an uplinking device 28 with each device operator 14 as indicated at 30 on FIG. 2. The uplinking devices 28 are assign by the subscribing organization 22 to which the device operators 14 belong then adds internal support members at step 34. The uplinking devices 28 will be described in further detail below and are used by the individual device operators 14. Device operators 14 set up information within the uplinking device 28 to their home office 38. This is usually done by configuring the uplinking device 28 with the particular information needed to make a network connection to the home office of the subscribing organization 22. As shown in FIG. 1, the subscribing organization 22 or company, device operator 14, and ISM 16 are all on the right-hand side which indicates they all are part of the organization 22 that subscribes to the system 10 of this invention.

Returning to the internal and external support members 16, 18, these are people having a particular skill set in a particular industry that is specialized. For instance, in the HVAC industry there are numerous types of HVAC systems that may be used in a residential setting and still more types of HVAC systems that are used in commercial settings. It is highly unlikely that a single person could have full knowledge of every brand and every type of system that may be used. Therefore, when a device operator 14 who serves as a technician is new to the industry, or is a seasoned veteran working on a particular piece of equipment that is new to him or brand of equipment that is new to him, that device operator 14 may need assistance to solve a problem more quickly than he could on his own. Although the HVAC industry has been used as an example, this is certainly true of other industries as well. As can easily be seen, the system 10 is extremely useful to newer field technicians who are the device operators 14 who may need frequent consultation with more seasoned experts in their profession who are the internal and external support members 16, 18 that are carefully selected experts in their respective fields.

Figure 3:
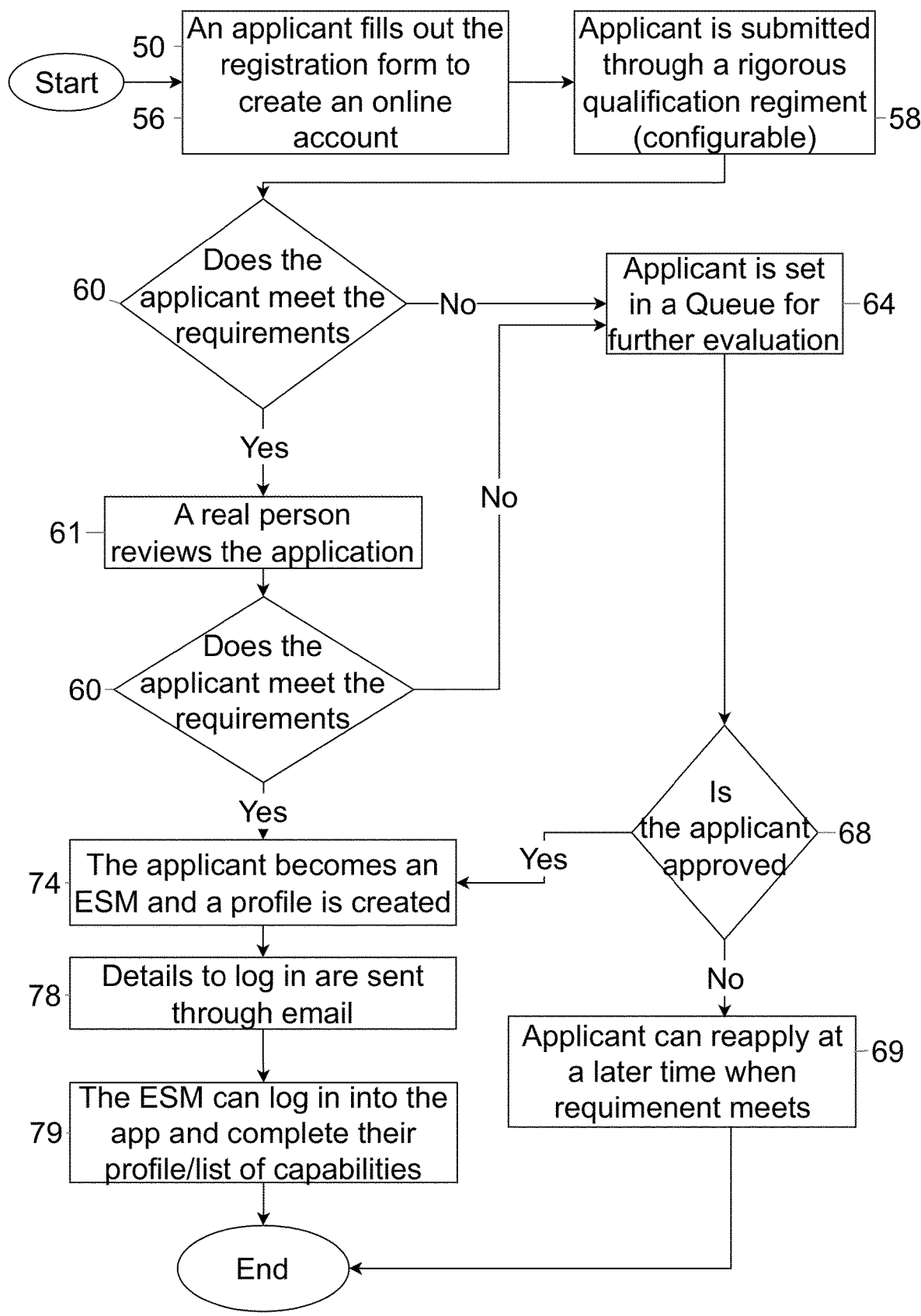
FIG. 3 is the registration procedure for external support members.

At the outset of setting up the system 10, the ISMs and ESMs 16, 18 must be vetted to determine their level of expertise within their industry. FIG. 3 shows the vetting process for ESMs 18. This process is largely the same for internal support members 16. FIG. 3 discusses the selection of ESMs 18 because they are not as likely to be known to the subscribing organization 22 using the system 10 as would their own employees who would typically be the internal support members 16. However, the forms that would be used to collect data on both ISMs and ESMs 16, 18 would be the same because the usefulness of the ISMs and ESMs 16, 18 largely depends on their experience and skill set. At the outset as a first step shown at box 56 on FIG. 3, a proposed ESM 50, or applicant 19, fills out a registration form to create an online account. Typically, the form would be an online form. The data collected during the completion of the registration is stored on a computer in a database that is connected to the internet. As a next step at box 58, personnel working as part of the system 10 evaluate the information on the particular proposed ESM 50 that is contained within the completed form as mentioned in step 56. The personnel working as part of the system 10 to evaluate information on ESMs 50 are typically employees of the providing company 21, but may be subcontractors of the providing company 21 or have some other affiliation with the providing company 21. After that evaluation, a decision 60 is made on whether the proposed ESM 50 has the qualifications to become an ESM 18. A person reviews the application for that proposed ESM 50 at step 61. In the case that the proposed ESM 50 is not determined to be an appropriate ESM 18, the proposed ESM 50 will be put in a queue 64 for further evaluation. Once in the queue 64, the proposed ESM 50 may be chosen to be approved to become an ESM 18 or not at step 68. In the event that the proposed external support member 50 is rejected, that applicant may apply at a later time 69 because it may be the case that the proposed ESM 50 will at some point attain skills or experience that will be applicable to become an ESM 18 within the system 10. In the event that a proposed ESM 50 is chosen to be an ESM 18 within the system 10, that step is shown at 74 on FIG. 3. At that time, a profile is created, activated, and stored on a computer in the network. After the proposed ESM 50 is made an ESM 18, he is provided with details to log in through email 78. At step 79, the ESM 18 can log in and complete their profile. It is generally contemplated that the providing company 21 will provide a large pool of ESMs 18 that will be either employees of the providing company 21 directly, or channeled through the network and linked up through the providing company's connections with many subscribing organizations 22 that allow use of their employees across the network.

Figure 4A:
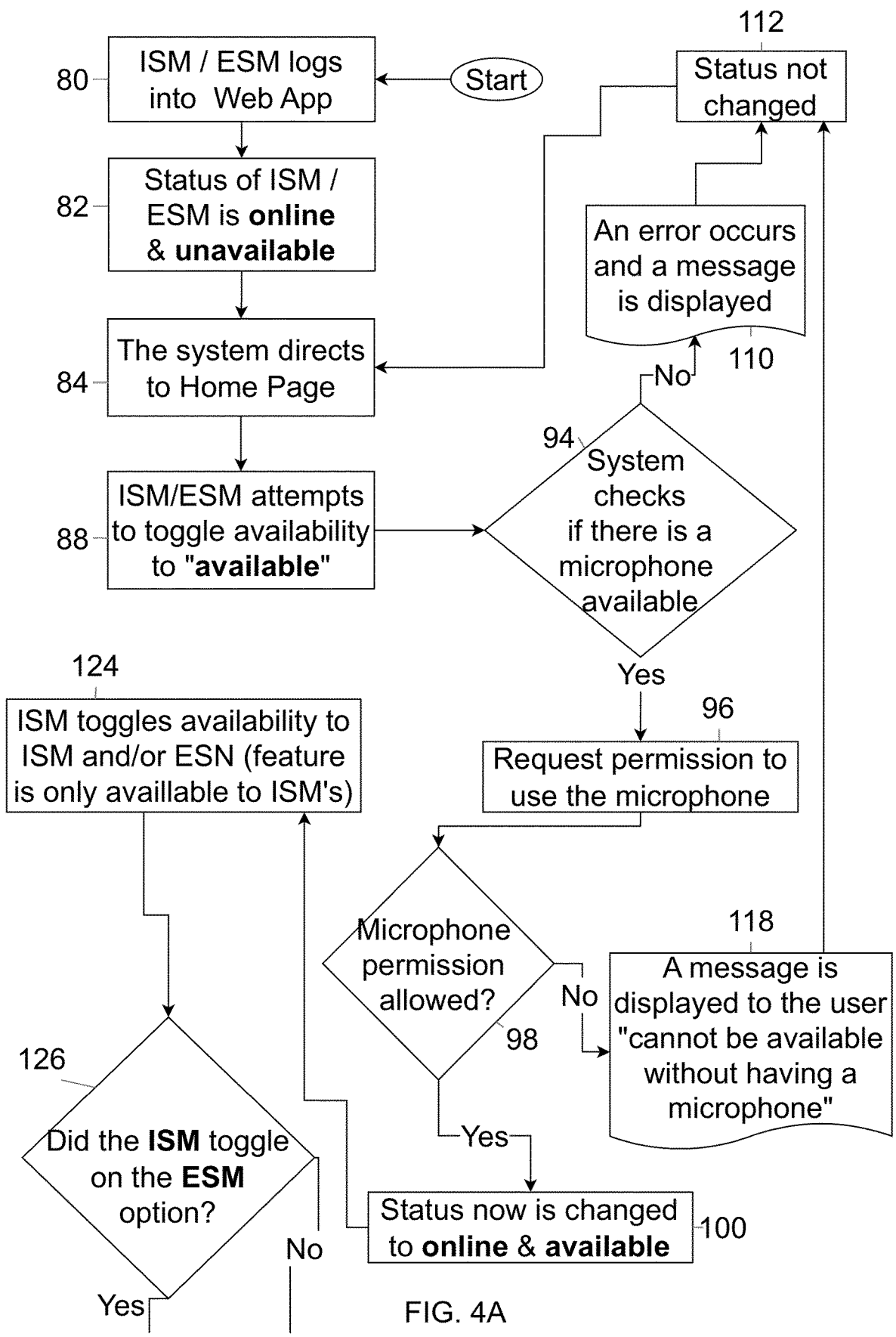
FIG. 4A is a flow diagram of a portion of the process for linking up with internal or external support members, the broken lines indicating portions of an entire process documented over multiple FIGS.
Figure 4B:
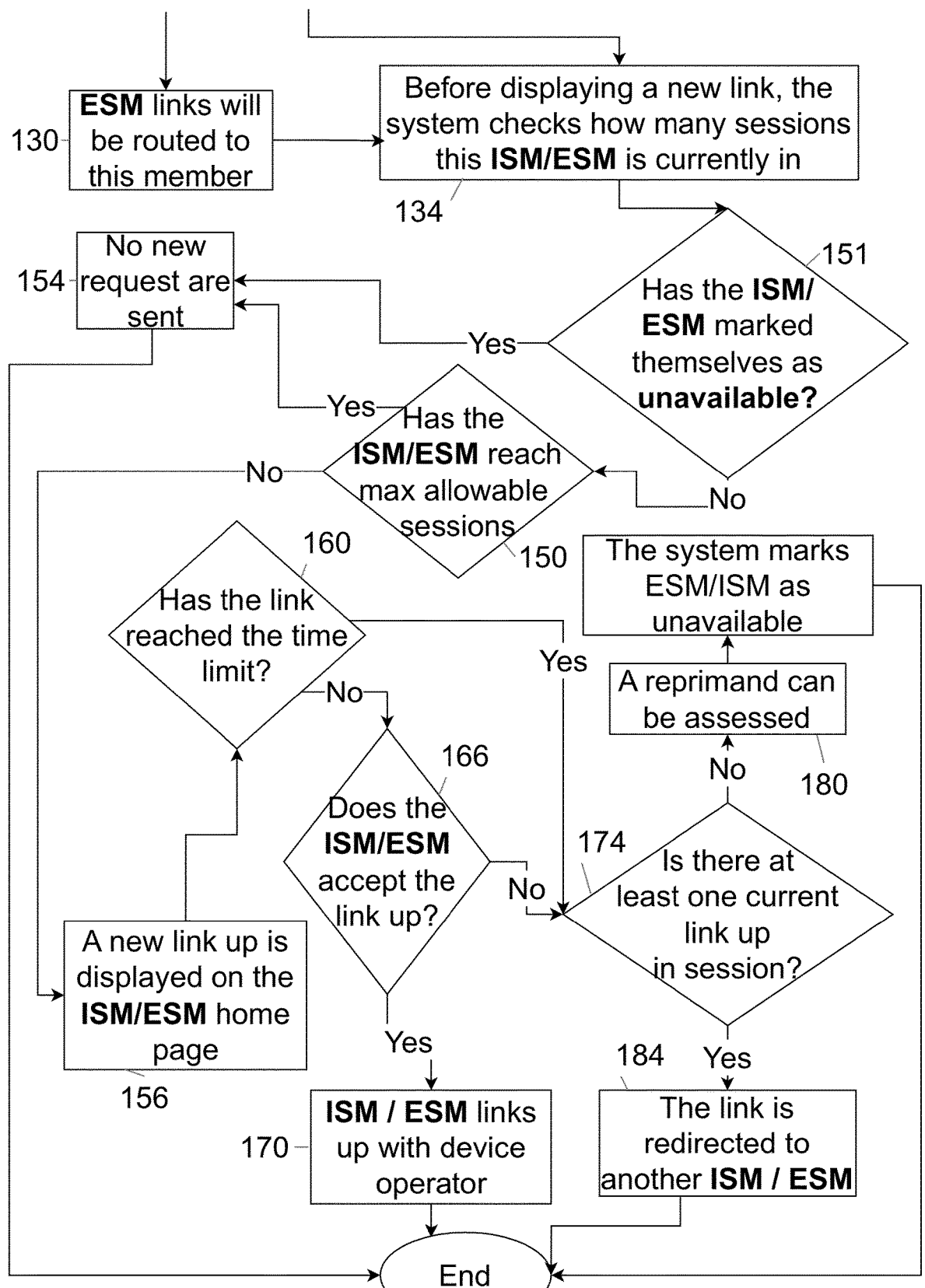
FIG. 4B is a continuation of the flow diagram of FIG. 4A on a separate page for the remaining portion of the process for linking up with internal or external support members and the lead lines continue between FIGS. 4A and 4B as shown, the broken lines indicating portions of an entire process documented over multiple FIGS.

Within the system 10, an ISM or ESM 16, 18 must initially log into the system 10 at step 80 on FIG. 4 by logging into the application. The application is a web-based application that may be located on a computer or other portable device that allows connection with the system 10. The initial status of the ISM or ESM 16, 18 is online but unavailable 82 immediately after logging in. Once the ISM or ESM 16, 18 is logged in, the system directs the ISM or ESM 16, 18 to a home page 84 within the application. The ISM or ESM 16, 18 must change his status to available 88, and then the system 10 through the application checks to see if a microphone is available 94 and connected to the device the ISM or ESM 16, 18 is using. A microphone must be present for the ISM or ESM 16, 18 to change his status to available because he will need the microphone to communicate over the system 10. If the system determines at 94 that a microphone is present, it checks to see if the user has allowed permission to use the microphone 96 on the device he is using. If permission is allowed, a decision is made at 98 to show the status of the particular ISM or ESM 16, 18 as online and available 100. In the event no microphone is present when the system checks for one at step 94, then an error message is displayed 110 showing that no microphone is present. In the case that no microphone is available, the status is not changed to active at step 112 for the ISM or ESM 16, 18. If no microphone permission is allowed at step 98, then a message is displayed at 118 stating that a user "cannot be available without having a microphone" and then the system reverts to 112 showing the status of the ISM/ESM 16, 18 is not changed from unavailable.

Once the internal support member 16 is toggled to online and available, he has an available option to direct that availability to the internal network, the external network, or both and this is indicated at 124. Box 126 shows the flow of choices that stem from whether the ISM 16 has indicated an availability for the external network or the internal network and refers to toggling the ESN (external support network) option. In the event the ISM 16 has indicated an availability for the ESN, calls from the external network will be routed to the ISM 16 which is shown at 130. These calls will be from other subscribing organizations 21 different than the one that employs that particular ISM 16. As stated above, this is a way that the providing company 21 serves as a conduit to connect a network ESMs 18. Before displaying a new link-up that will allow a connection to that particular internal support member 16, the system 10 checks to see how many sessions that particular ISM or ESM 16, 18 has in progress. This is shown at box 134. It is possible for an ISM or ESM 16, 18 to be on multiple sessions simultaneously. At times this is possible because an ISM or ESM 16, 18 may be in sessions that do not require full attention because the advice the ISM or ESM 16, 18 provides may take time for the device operator 14 to execute. This provides some down time for the ISM or ESM 16, 18 during a session. In such situations, the ISM or ESM 16, 18 may turn their attention to another session while a device operator 14 executes the instructions that the ISM or ESM 16, 18 provides. The subscribing organization 22 administrator can set a maximum limit on the number of simultaneous sessions that an ISM or ESM 16, 18 can be in. That ISM or ESM 16, 18 can change the maximum number based on the types of calls he may have at the time. In some cases, the ISM or ESM 16, 18 may realize he is in an intense type of session that will require full attention and therefore need to limit the amount of simultaneous sessions that can be taken at a particular time. The system can determine whether the ISM or ESM 16, 18 has made themselves available 151 and then determines whether the limit of simultaneous settings for a particular ISM or ESM 16, 18 has been reached at 150. If the maximum number of sessions is reached 154, then no new links will be displayed for that particular ISM or ESM 16, 18. If the maximum number of sessions has not been reached, a new link is displayed on a ISM/ESM's 16, 18 home page 156. The new link is displayed for a limited amount of time. The system 10 determines whether the new link has reached its time limit 160. In the event the time limit is not reached, a decision is made 166 whether the ISM or ESM 16, 18 accepts a connection with a device operator 14 via the link. In the event the ISM or ESM 16, 18 does accept a connection with a device operator 14 as indicated at 170, a connection is made and a session begins in which the ISM or ESM 16, 18 may provide guidance to a device operator 14. If a connection is not made with the ISM or ESM 16, 18 the system determines whether there is at least one session at the time the connection is not made by the ISM or ESM 16, 18 as indicated at 174. If there is no session at the time the ISM or ESM 16, 18 does not make a connection 180, a reprimand may be issued. This may be done so that ISMs and ESMs 16, 18 do not simply avoid connecting to device operators 14. In the case that there is a session in progress 184, the link that a device operator 14 may use is redirected to another ISM or ESM 16, 18.

Figure 5A:
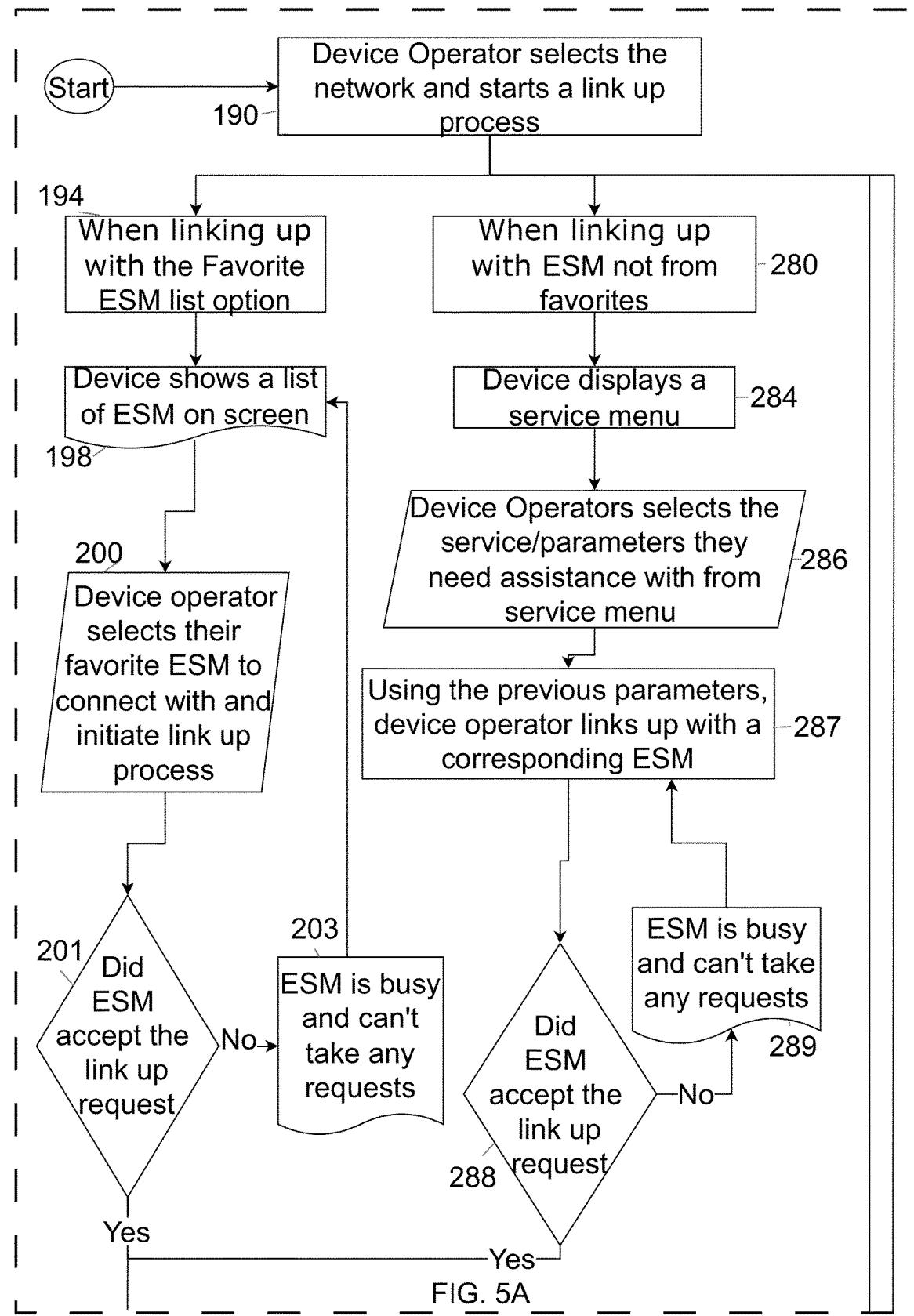
FIG. 5A is a flow diagram of a portion of the process for the process of a device operator choosing whether to link up with an internal or external support member and whether to choose a support member from the device operator's favorite list or whether to let the system choose the support member that the system deems appropriate, the broken lines indicating portions of an entire process documented over multiple FIGS.
Figure 5B:
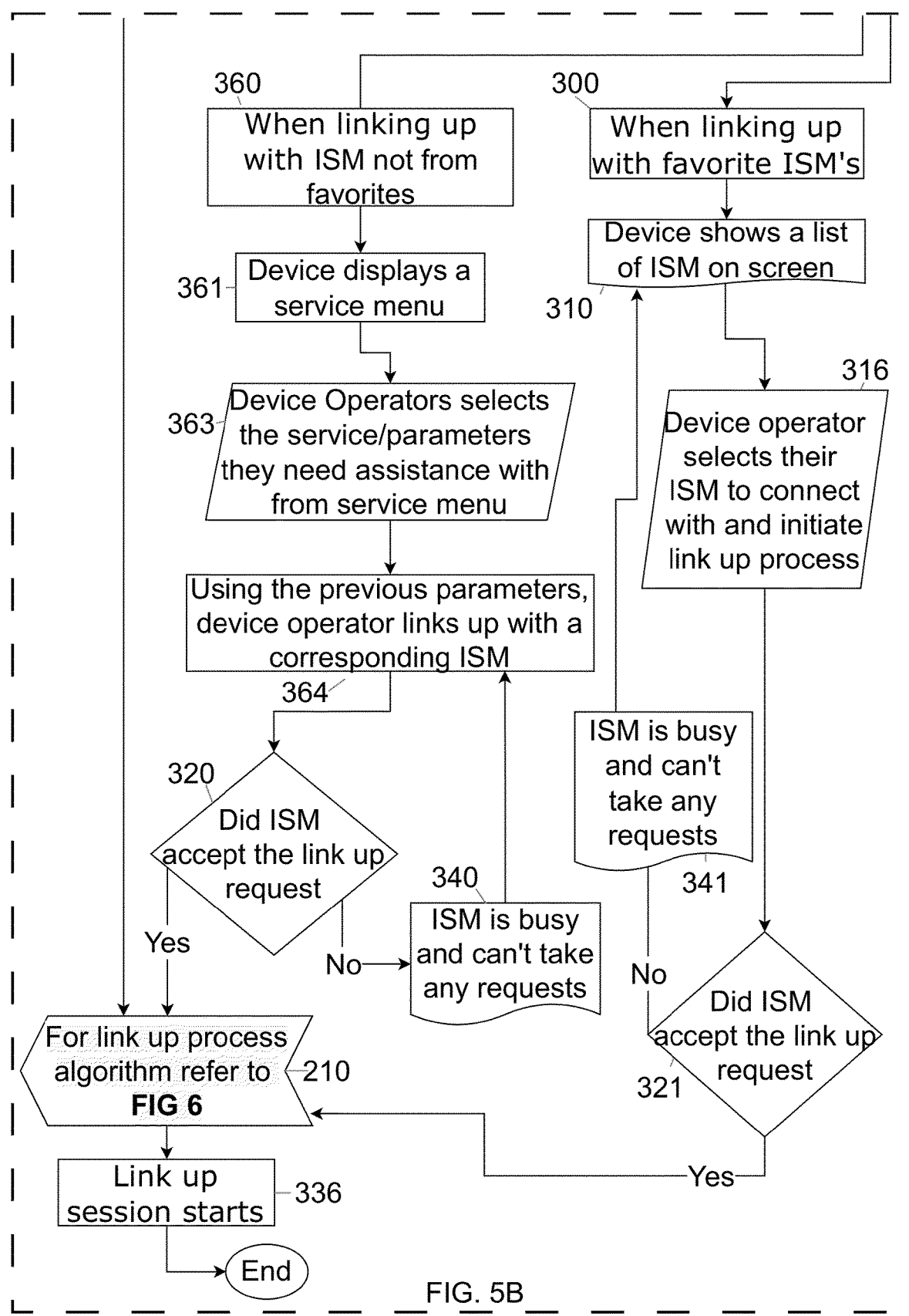
FIG. 5B is a continuation of the flow diagram of FIG. 5A for the process of a device operator choosing whether to link up with an internal or external support member and whether to choose a support member from the device operator's favorite list or whether to let the system choose the support member that the system deems appropriate, the broken lines indicating portions of an entire process documented over multiple FIGS.

FIGS. 5A and 5B illustrate how a device operator 14 selects a network and links up to a session. At the outset the device operator 14 uses his uplinking device 28 that includes a camera and a microphone for transmitting video and audio information for the session. The device operator 14 initially makes a decision whether to connect to an external network or an internal network 31, 32 at box 190. If the device operator 14 chooses to link up to the ESN 194, 280 for external support outside of his own organization 22, that choice is generally indicated on the left side of FIG. 5A. This is shown by the two leftmost columns in FIG. 5A. If the device operator 14 chooses to link up internally within his own organization 22 using an internal network, that choice will generally be reflected by the lead lines on the right side of FIG. 5A that extend into the description of details within FIG. 5B that thoroughly describe the choice of linking up within the device operator's 14 own subscribing organization 21.

Regarding the left side of FIG. 5A which shows the choice of the ESN, the system 10 allows a device operator 14 to store a list of his favorite ESMs 18 as indicated at 194 and he may link up to one of those favorite ESMs 18. The uplinking device 28 shows a list of ESMs 18 on the screen 198 and the device operator 14 selects their favorite ESM 18 as indicated at 200. The system 10 then determines whether the ESM 18 accepted the link up request 201. If the ESM 18 did accept the link up request, the link up session starts 336. If the ESM 18 did not accept the link up request, the system 10 directs the device operator 14 to link up with another ESM 18 as indicated at 203. Once a link up session has begun, box 210 on FIG. 5B shows how the flow chart then transfers over the process shown in FIG. 6.

Figure 6:
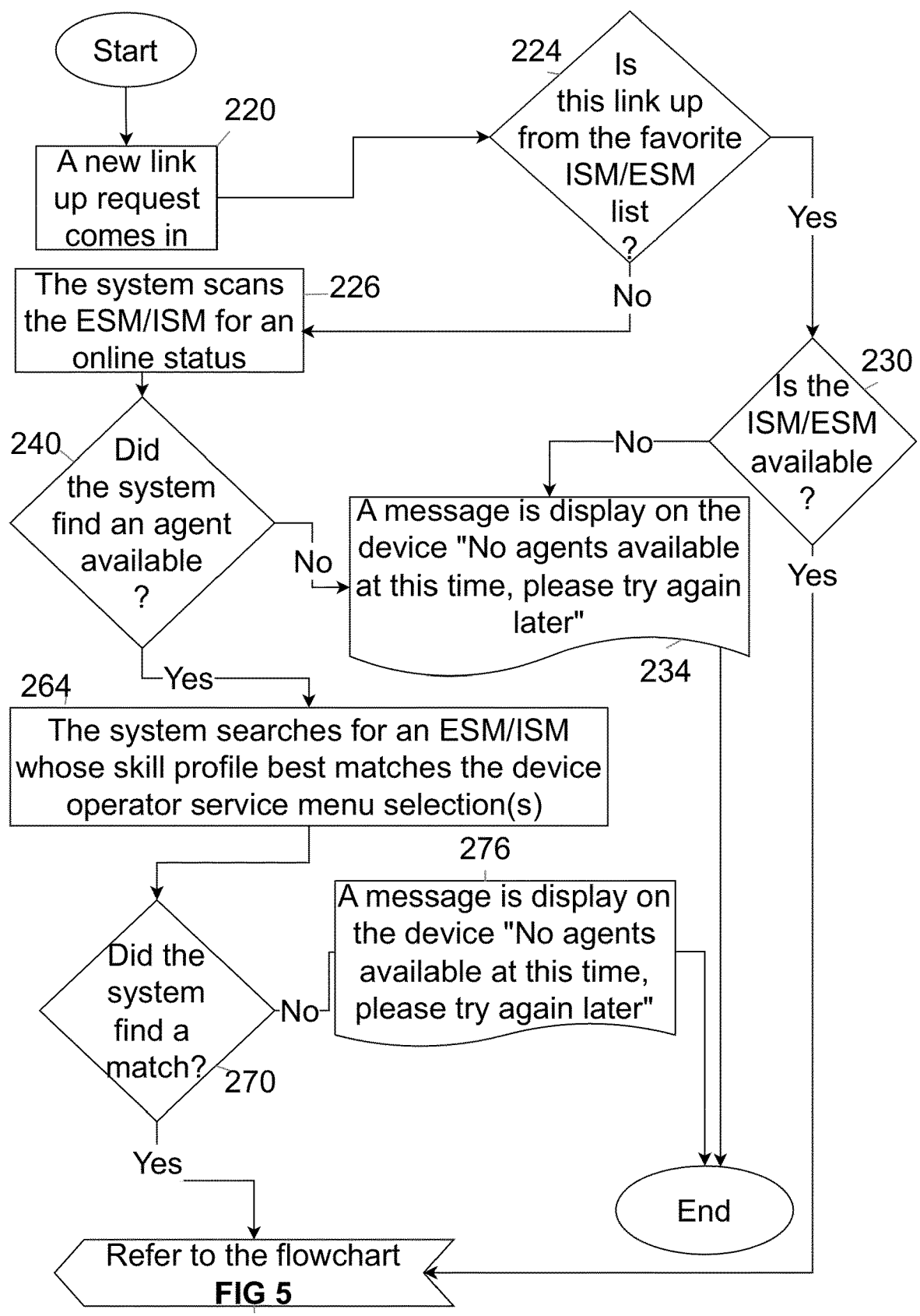
FIG. 6 is a flow diagram of how the system works through choosing an external or internal support member.

FIG. 6 demonstrates the process that occurs over the system 10 to find a suitable support member whether from the ISM and/or ESM 16, 18. At the start in FIG. 6, a link up request will arrive into the system 10 as indicated at 220. A determination is made whether the ISM or ESM 16, 18 is on the favorite ISM or ESM 16, 18 list as indicated at 224. If the link up request is not from the ESM 18 favorite list, the process moves to 226 where the system scans for an ESM 18 or ISM 16 having an online and available status. If the link up request is from the favorite ISM or ESM 16, 18 list, then it must be determined whether that ISM or ESM 16, 18 is available 230. If that favorite ISM or ESM 16, 18 is not available, the system 10 will display a message that "no agents available at this time, please try again later" 234. If the link up is not from the favorite ISM or ESM list 224, then the system 10 scans for an ISM or ESM 16, 18 having an online status 226. A decision is made based on whether the system 10 found an agent or not at step 240. In the event no agent was found, the system proceeds to box 234. In the event an agent is available, the system determines whether there is an agent having the skills to handle the request of the device operator 14 at box 264. A decision is made whether there is a match or not at step 270. If a match is found at box 270, then the system 10 proceeds to box 296 which refers to the link up session shown at 336 in FIG. 5B. If there is not a match for an agent at box 270, then the system returns to box 276 on FIG. 6. Ultimately, if no ISM or ESM 16, 18 is available the message in box 276 on FIG. 6 indicates "no agents available at this time, please try again later," then the process ends temporarily and the device operator 14 may try again later.

Returning to step 190 in FIG. 5A, the system 10 must find an agent that is available 240 as described on FIG. 6. In the event that the system 10 finds ISM or ESM 16, 18 that is available after step 240, the system searches for one whose skills best match the device or problem for which the device operator 14 seeks assistance as indicated at 264 on FIG. 6. In the event that the system does find a match for an ISM or ESM 16, 18 the process carries on from the point of box 210 on FIG. 5B, and upon a match, a link up session starts at box 336 on FIG. 5B with the device operator 14 and the selected ISM or ESM 16, 18.

Returning back to FIG. 5A, if the device operator 14 seeking to link up chooses to proceed to link up with ESM 18 but does not choose from a list of favorites that is stored, that decision is reflected at box 280. Because this is not a favorite ESM 18, a menu is displayed 284 that provides a list of services and parameters for which a device operator 14 may need assistance. Within the menu of the uplinking device 28, the device operator 14 selects the service and/or parameters he needs assistance with to initiate the link up process indicated at 286. The system 10 uses the parameters entered at 286, and chooses an appropriate ESM 18 at box 287. The parameters entered at 286 may be stored on a computer database that has an extensive list of types of equipment to be serviced and paired with experienced ESMs 18 that have knowledge about the equipment that the device operator 14 will be servicing. The parameters entered at 286 may also be processed by an algorithm on a computer within the system 10 in the event that a particular ESM 18 has skill for a particular type of equipment similar to what he is accustomed to providing advice upon even when there is not an exact match. After that determination of an appropriate ESM 18 is made, the system 10 determines whether that ESM 18 has accepted the link up request at 288. If the ESM 18 did accept the link up request, the system progresses to 210. In the event the ESM 18 did not accept the link up request, the system moves to step 289 and states the ESM 18 is busy and cannot take requests then moves back to step 287. Once the process steps shown on FIG. 6 reach box 296, the link up session begins because this takes the system 10 to the location of box 336 on FIG. 5B.

In FIG. 5B, if the device operator 14 seeking to link up chooses to proceed to link up with an ISM 16 on his favorite list, that choice is reflected at box 300 on FIG. 5B. The uplinking device 28 shows a list of ISMs 16 on the screen 310. The device operator 14 then chooses the favorite ISM 16 to initiate the link up process 316. The system 10 then determines whether the ISM 16 accepted the link up request 321. If the ISM 16 did accept the link up request, the link up session starts 336. If the ISM 16 did not accept the link up request 341, the system 10 directs the device operator 14 to link up with another ISM 16 as indicated at 310.

In the event the device operator 14 does not choose an ISM 16 from his favorites list, this is indicated at box 360. Because this is not a favorite ISM, a menu is displayed 361 that provides a list of services and/or parameters for which a device operator 14 may need assistance. Within the menu of the uplinking device 28, the device operator 14 selects the service and/or parameters he needs assistance with to initiate the link up process indicated at 363. The system 10 uses the parameters entered at 363, and chooses an appropriate ISM 16 at box 364. The system 10 then goes to the step indicated at box 320.

Figure 7A:
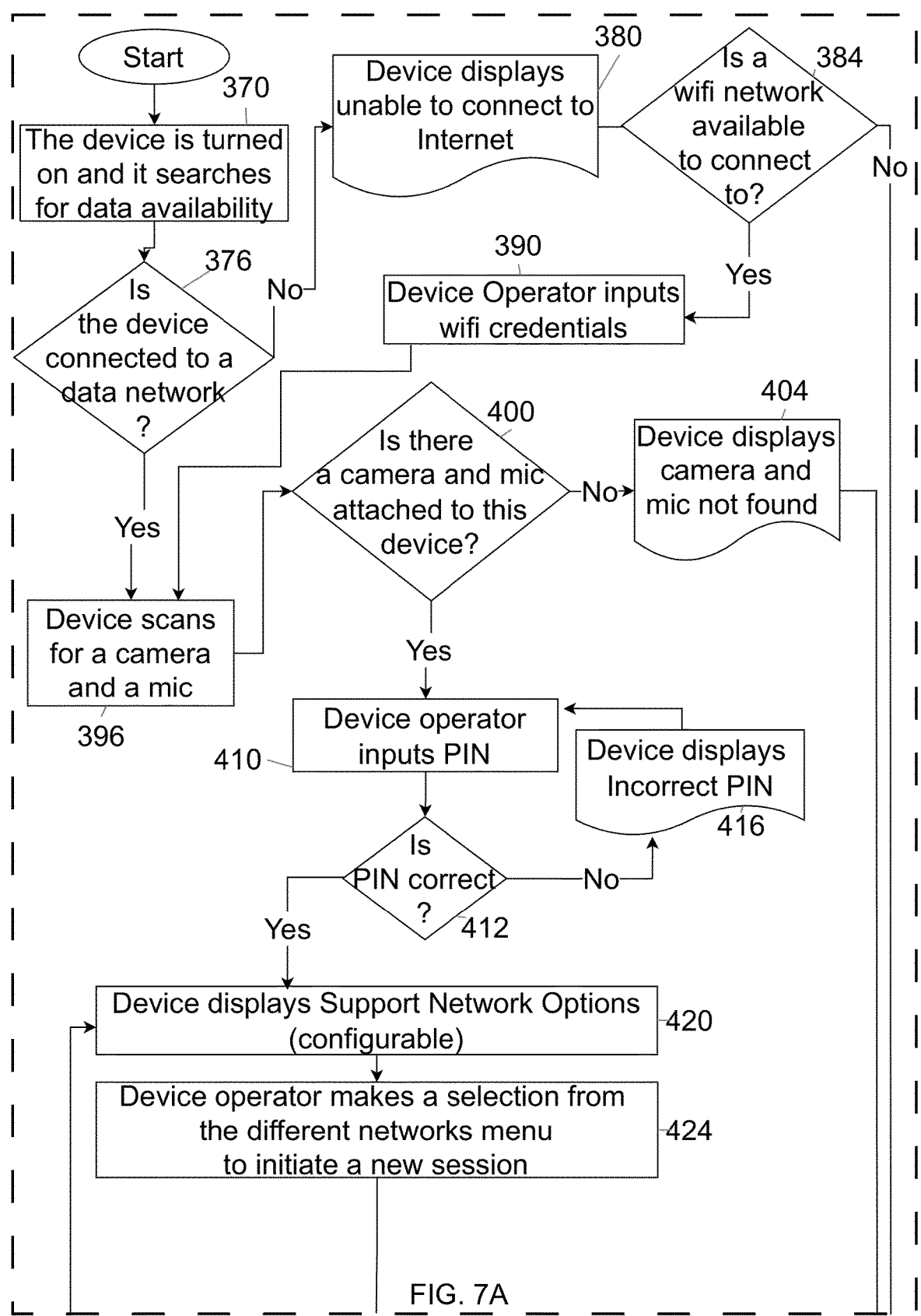
FIG. 7A is flow diagram of a portion for the process for link up architecture showing how a device operator turns on the uplinking device and how the system of the invention is navigated, the broken lines indicating portions of an entire process documented over multiple FIGS.
Figure 7B:
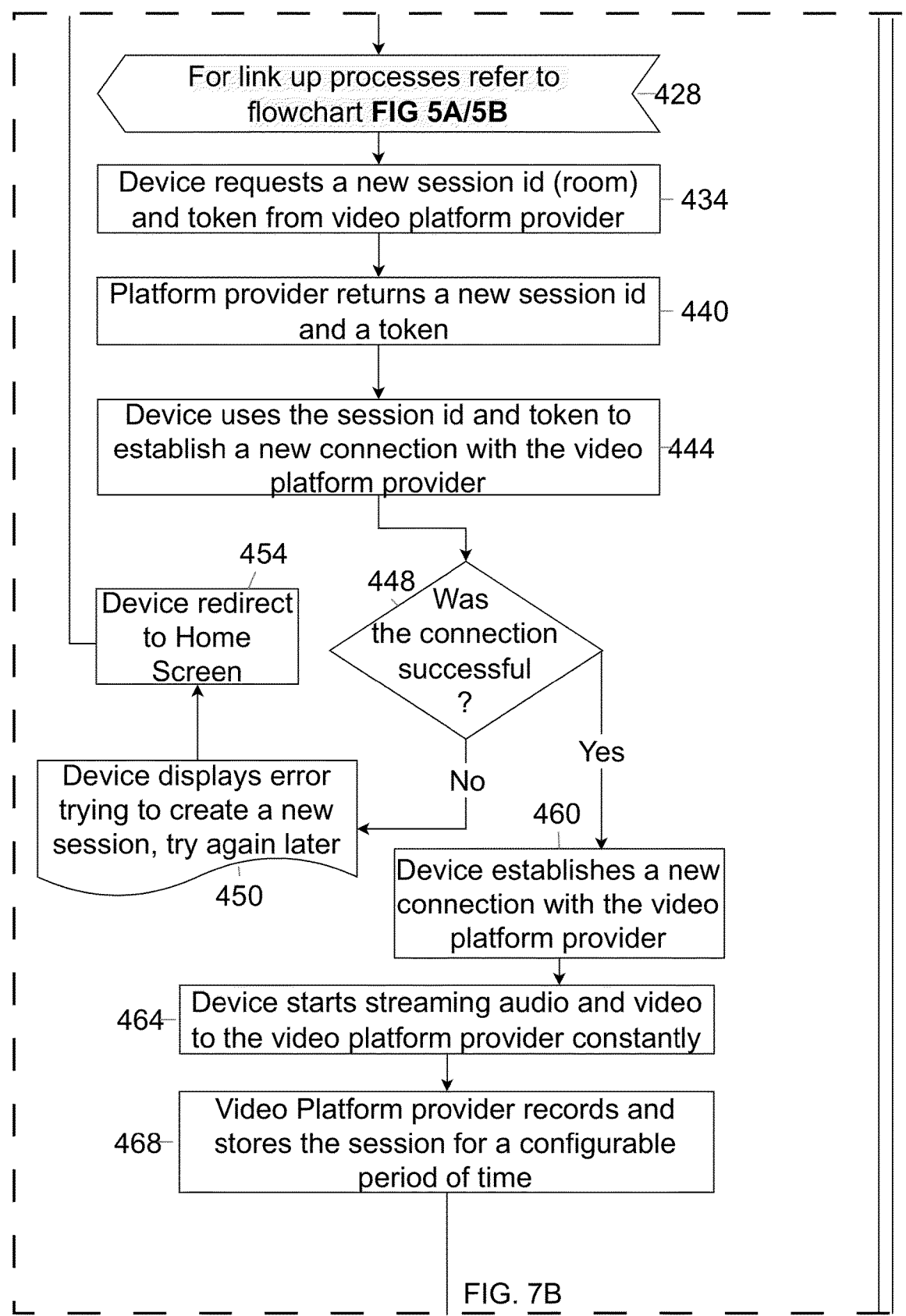
FIG. 7B is a continuation of the flow diagram of FIG. 7A on a separate page for the process for link up architecture showing how a device operator turns on the uplinking device and how the system of the invention is navigated, the broken lines indicating portions of an entire process documented over multiple FIGS.
Figure 7C:
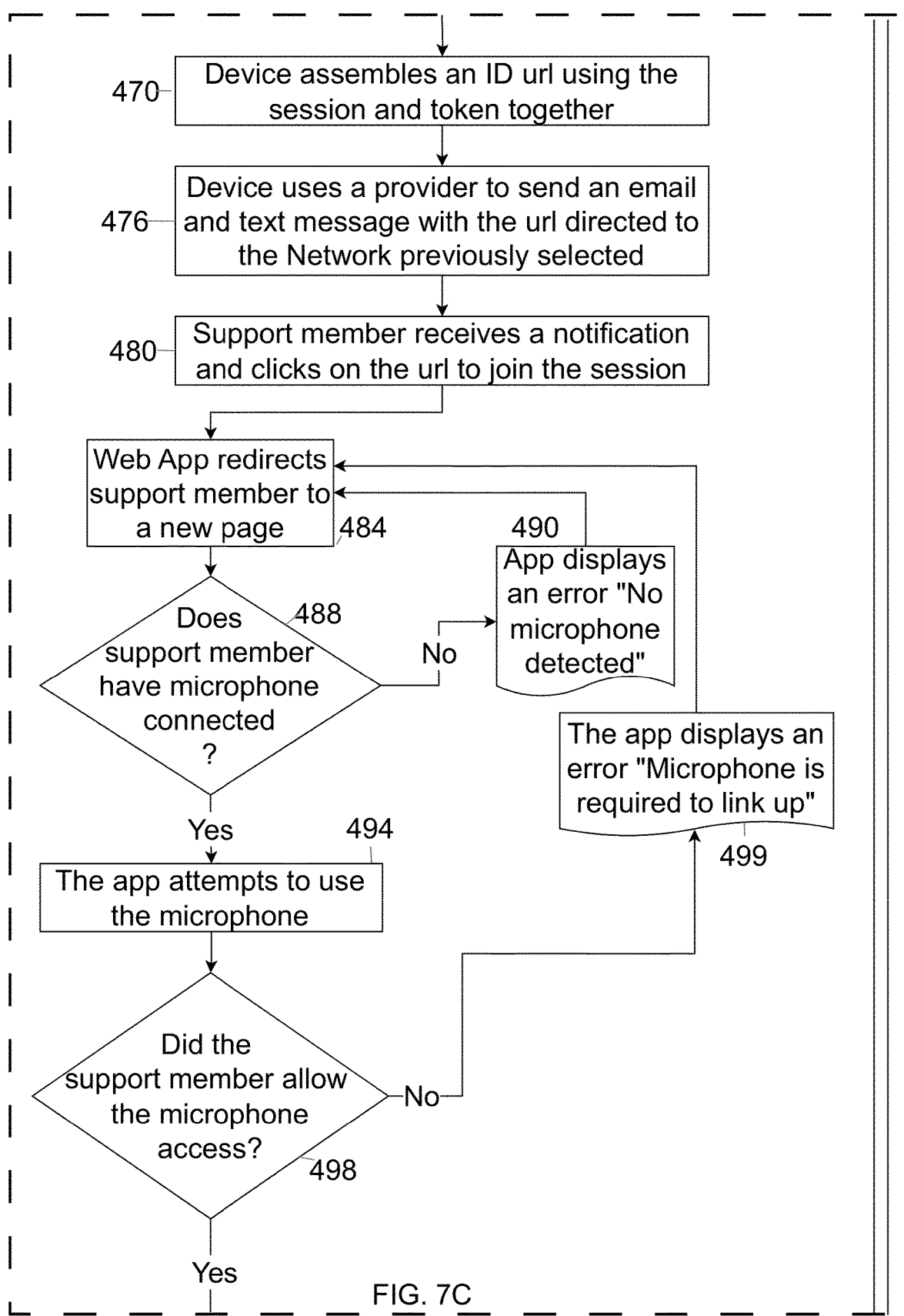
FIG. 7C is a continuation of the flow diagrams of FIGS. 7A and 7B on a separate page for the process for link up architecture showing how a device operator turns on the uplinking device and how the system of the invention is navigated, the broken lines indicating portions of an entire process documented over multiple FIGS.
Figure 7D:
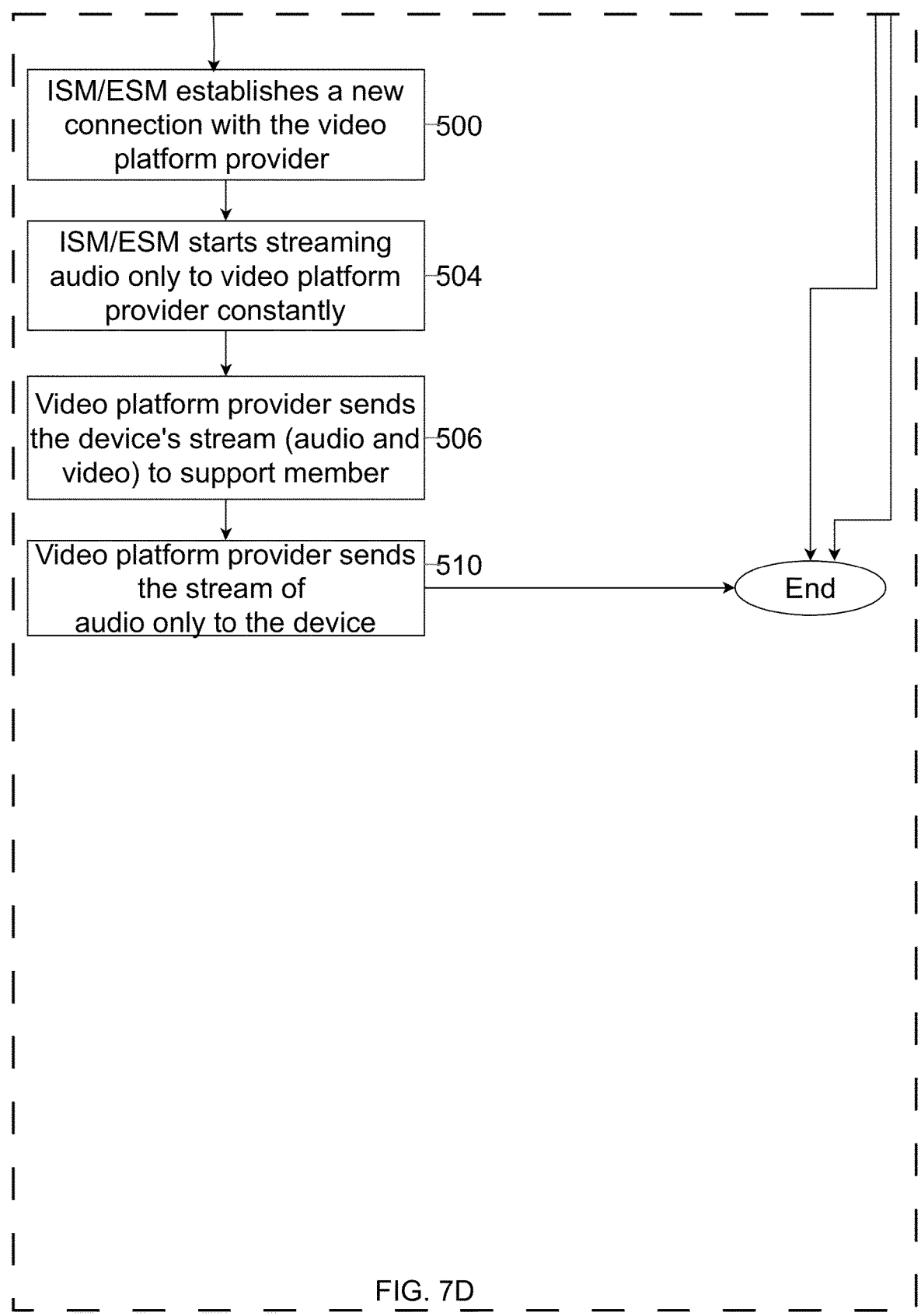
FIG. 7D is a continuation of the flow diagrams of FIGS. 7A-7C on a separate page for the process for link up architecture showing how a device operator turns on the uplinking device and how the system of the invention is navigated, the broken lines indicating portions of an entire process documented over multiple FIGS.

Jumping forward now to FIGS. 7A-7D, these show details of how a device operator 14 logs into the system 10 from his perspective. It should be noted that the only reason FIGS. 7A7D are separated is for clarity on standard paper size required for filing. FIGS. 7A7D are directly linked by their connecting lines indicating the flow of the steps contained therein. The uplinking device 28 is turned on and searches for the availability of data at 370 in FIG. 7A, the uplinking device 28 determines whether it is connected to a data network 376. In the event a network is not detected 380, the uplinking device 28 seeks out a WIFI connection 384. If no WIFI connection is available, the uplinking device 28 ends the attempted session because a network connection is necessary for the uplinking device 28 to be useful. In the event a WIFI network is found, the device operator 14 inputs the WIFI credentials at 390. After that, the uplinking device 28 scans for a camera and microphone 396. The device 28 determines whether a camera and microphone are attached 400. In the event a camera and a microphone are not found attached 404, the session ends. Once it is determined that a camera and microphone are attached, the device operator 14 inputs a PIN at 410. The system 10 determines whether the PIN is correct at 412. If the PIN is determined to be incorrect 416, then the uplinking device 28 requests a PIN again 410. Once the PIN is correctly entered, the uplinking device 28 displays support network options 420. The device operator 14 then makes a selection from the different networks available at 424. Once the device operator 14 makes his selection 428, the process follows the flow as shown in FIGS. 5A and 5B. After the network selection is made at 424, the uplinking device 28, requests a new session ID corresponding to a room and a token from the video platform 434. The platform returns a new session ID and a token 440. The device 28 uses the session ID and token to establish a new connection with the video platform 444 on FIG. 7C. The system 10 must then determine whether the connection was successful 448. If the connection is not successful, the uplinking device 28 displays an error advising it is trying to create a new session and tells the device operator 14 to try again later 450. After receiving the message at 450, the device 28 will return to the home screen 454. If the connection was successful, the uplinking device 28 establishes a connection over the video platform 460. Upon establishing a connection, the device 28 starts streaming audio and video 464. The video platform records and stores the session for a period of time that may be configured to a predetermined time 468. The computer file containing the video and audio described 468 may be used for many purposes as described in below. The uplinking device 28 assembles a new Uniform Resource Locator (URL), using the session ID and token together 470. The uplinking device 28 sends an email and text message with the new URL to the network previously selected 476. The ISM or ESM 16, 18 receives a notification and clicks on the URL to join the session 480 on FIG. 7C. The email and text allow the ISM or ESM 16, 18 to use the application for linking up with the device operator via cell phone or potentially a computer. The email and text allow the ISM or ESM 16, 18, to be flexible to their preference of device as long as the ISM or ESM can receive video and audio over the cell phone or computer he is using. The web application redirects the ISM or ESM 16, 18 to a new page 484. A determination is made whether the ISM or ESM 16, 18 has a microphone connected 488. In the event that no microphone is detected 490, the application displays an error "no microphone detected." At that point, the ISM or ESM 16, 18 will be redirected to a new page where he will again have an opportunity to make sure the microphone is connected. When a microphone is detected, the application attempts to use the microphone 494. The system 10 makes a determination on whether the ISM or ESM 16, 18 allowed access to the microphone at step 498. In the event access to the microphone is not allowed, an error is displayed, "Microphone is required to link up" at 499. On FIG. 7D, the ISM or ESM 16, 18 establishes a new connection with the video platform 500. ESM/ISM 16, 18 streams only audio 504. Then the video platform sends the device operators video and audio stream 506 to the ISM or ESM 16, 18. The video platform will send the ISM/ESM's 16, 18 stream of audio to the uplinking device 28 as indicated at 510.

Figure 8A:
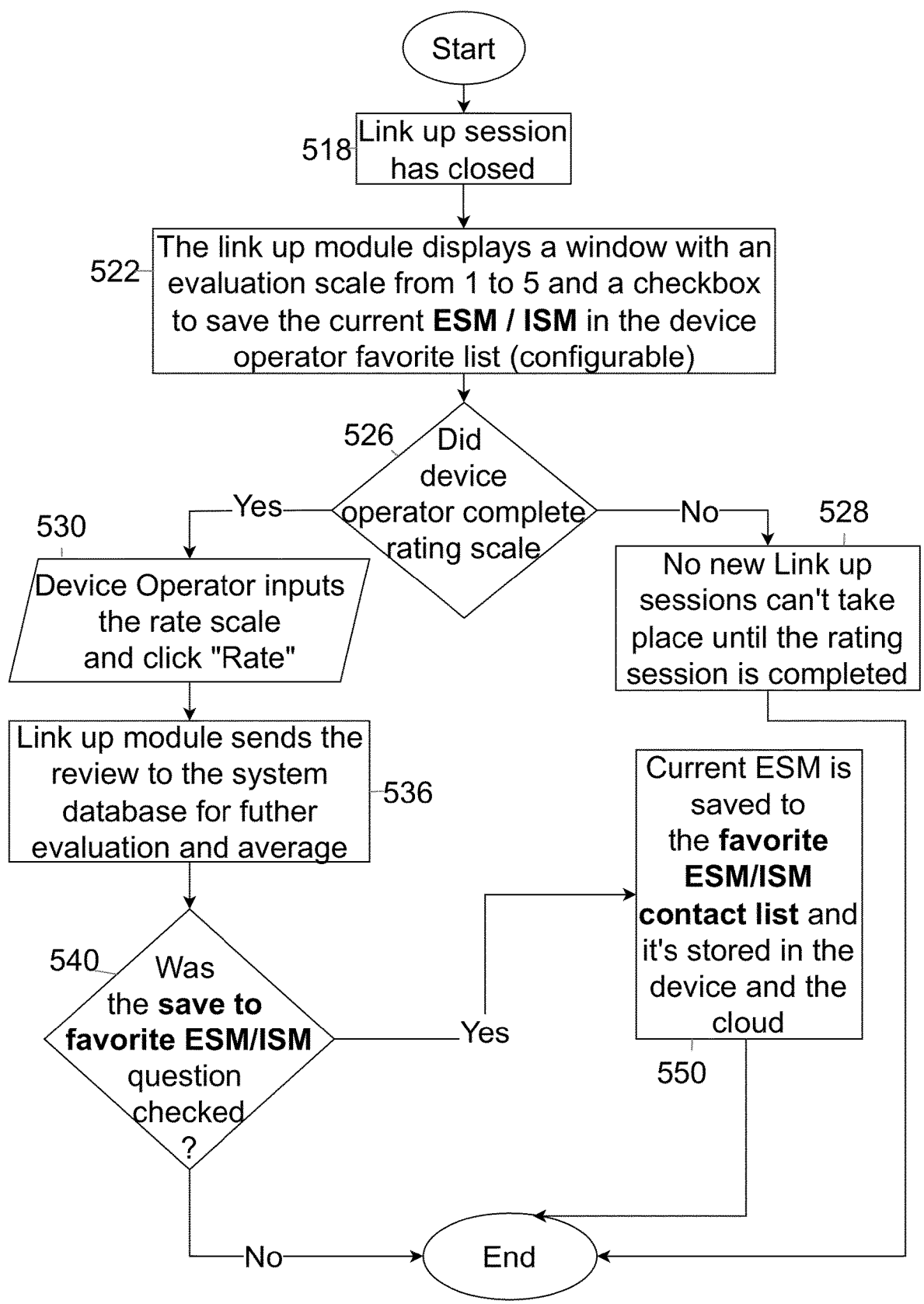
FIG. 8A is flow diagram of a portion for the process of describing how an external support member is rated, the broken lines indicating portions of an entire process documented over multiple FIGS.

FIG. 8A shows the process after a session is closed 518. After the close of the session 518, the application displays a window with an evaluation scale from 1 to 5 so that the device operator 14 may rate the ISM or ESM 16, 18 as indicated at 522. At that time, the device operator 14 may also save that ESM or ISM 16, 18 as a favorite for later 522 sessions. The system 10 must evaluate whether the device operator 14 completed a rating at 526. If the device operator 14 has not provided a rating 528, no new link up sessions may begin until a rating 528 has been provided. This serves as an enforcement mechanism to ensure that ratings are done. The device operator 14 finalizes his review 530 and clicks it in. Then, the system 10 sends the review to a database for storage and averages the rating with other stored ratings for that ISM or ESM 16, 18, as indicated at 536. After the rating is clicked at step 530, the system 10 determines whether the ISM or ESM 16, 18 was saved as a favorite 540. If that ISM or ESM 16, 18 was saved as a favorite 540, it is stored in the uplinking device 28 and the cloud to which the uplinking device 28 is connected 550. The cloud provides a computer that is remote from the uplinking device 28 so that even in the event that the uplinking device 28 is lost those settings can be retrieved.

Figure 8B:
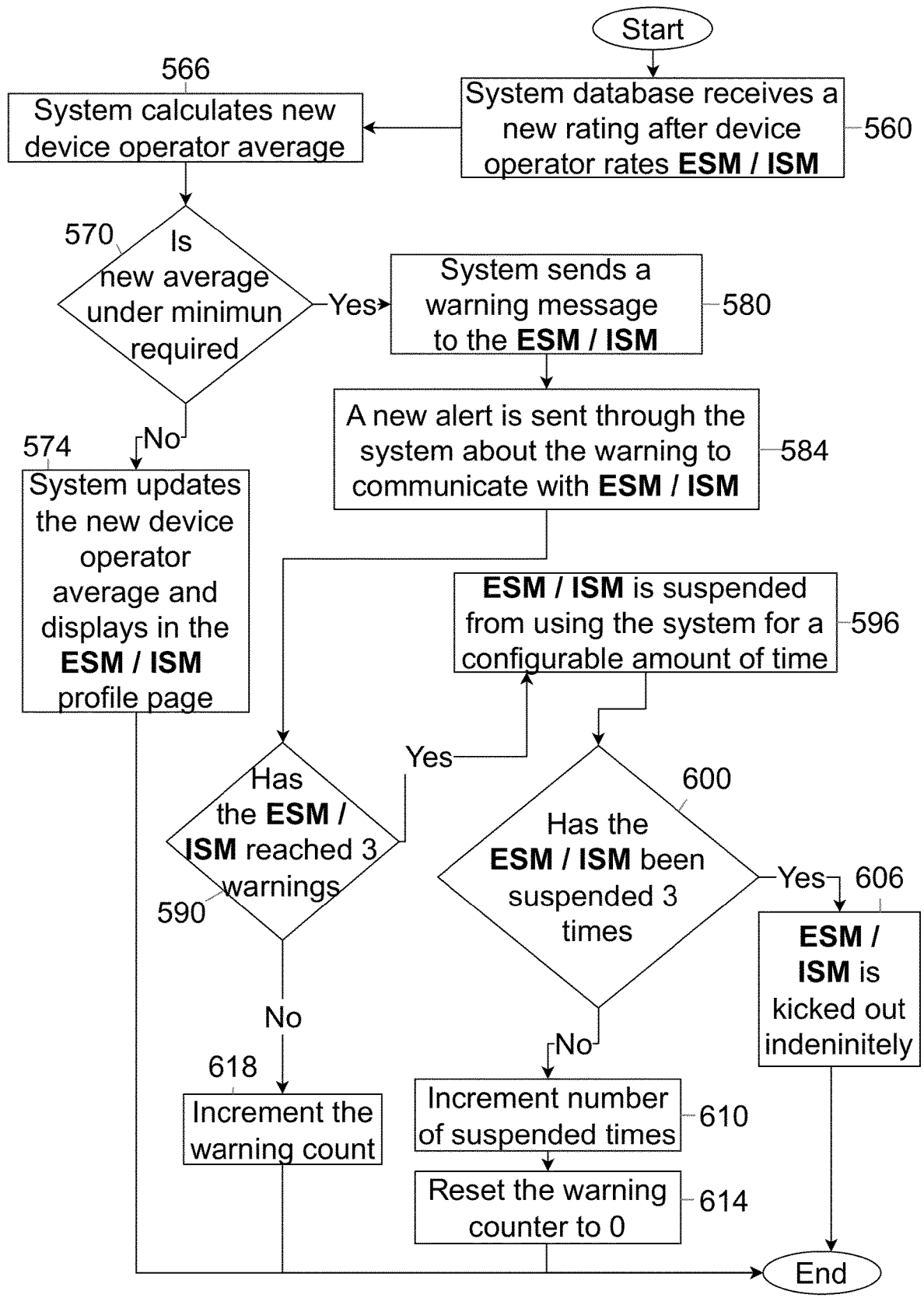
FIG. 8B is a continuation of the flow diagram of FIG. 8A on a separate page for the process of how the ratings of support members are processed, the broken lines indicating portions of an entire process documented over multiple FIGS.

Each time the system 10 receives a new rating for an ISM or ESM 16, 18, as indicated at 560 on FIG. 8B, an average is calculated at step 566. The system 10 must determine whether the average is below a predetermined minimum value 570. After the calculation of the average, the system 10 updates the average for that particular ISM or ESM 16, 18. The system 10 then updates the average and displays that average in the profile page for that ISM or ESM 16, 18, that is stored in a database, as indicated at 574. In the event that the new average for the ISM or ESM 16, 18 is below the predetermined minimum required average value 570, the system sends that ISM or ESM 16, 18 a warning message 580 to provide notification of that fact. An alert is also sent to the system 10 about the new substandard rating 584 an administrator working for the providing company 21 administering the system 10 may reach out to that individual. There is an opportunity for the ISM or ESM 16, 18 receiving such a warning to correct their behavior and increase their rating. The system 10 then determines whether the ESM or ISM 16, 18 has reached three warnings 590. In the event that the ISM or ESM 16, 18 has been warned three times, the ESM or ISM 16, 18 is banned from participating in further link up sessions for a predetermined and configurable amount of time 596. The system 10 evaluates whether the ISM or ESM 16, 18 has been banned three times or more 600. If the ISM or ESM 16, 18 has been banned three or more times, the ESM or ISM 16, 18 is kicked out of the system 10 indefinitely 606. If an ISM or ESM 16, 18 has not been banned three or more times, the number of times banned is incremented at 610. At this point the warning count is reset to zero 614. In the event that an ISM or ESM 16, 18 has not reached three warnings, the warning count is incremented 618.

Figure 9:
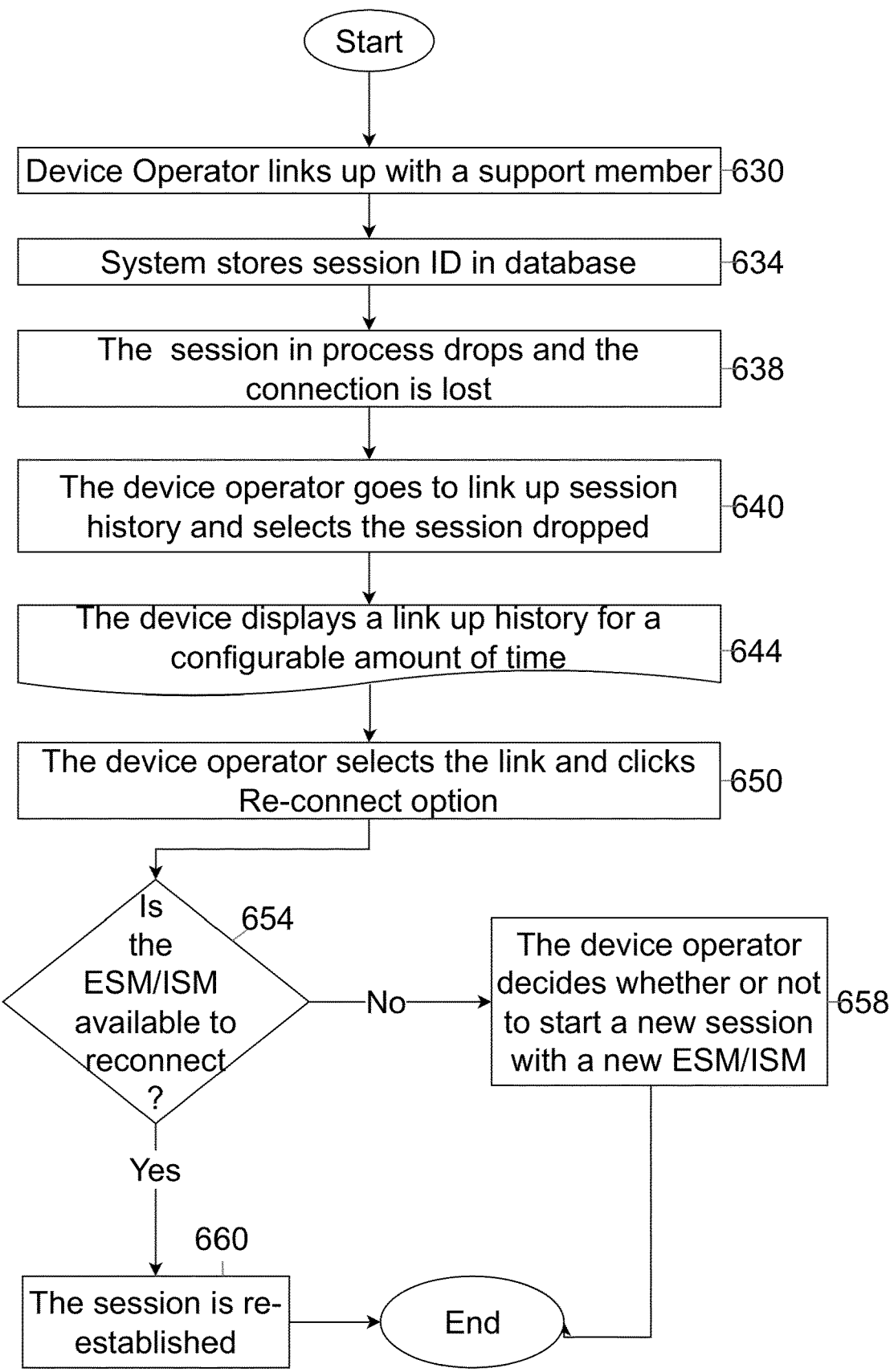
FIG. 9 is a flow diagram describing how dropped sessions are handled.

Referring to FIG. 9, it is useful to have a failsafe to prevent a complete disconnection from an ISM or ESM 16, 18 when working on a particular problem. The system 10 of this invention contemplates that a device operator 14 may link up with an ISM/ESM 16, 18 as indicated 630. As stated earlier, the system 10 stores the session ID in a database 634. In some cases, a session in progress between a device operator 14 and an ISM/ESM 16, 18 will be dropped 638. In such a case where a session is dropped, the device operator 14 can go to the link up session history and select the dropped session 640. The uplinking device 28 displays a link up history for a configurable and predetermined amount of time 644. The device operator 14 selects the link pertaining to the dropped session and clicks the reconnect option 650. At the time the reconnect option 650 is selected, the system 10 must determine whether the particular ISM/ESM 16, 18 is available 654. In the event that the same ISM/ESM 16, 18 is not available, the device operator 14 decides whether they would be willing to start a new session with a new ISM/ESM 16, 18, as indicated at 658. In the event that the same ISM/ESM 16, 18 is available, the session is reestablished 660.

Figure 10:
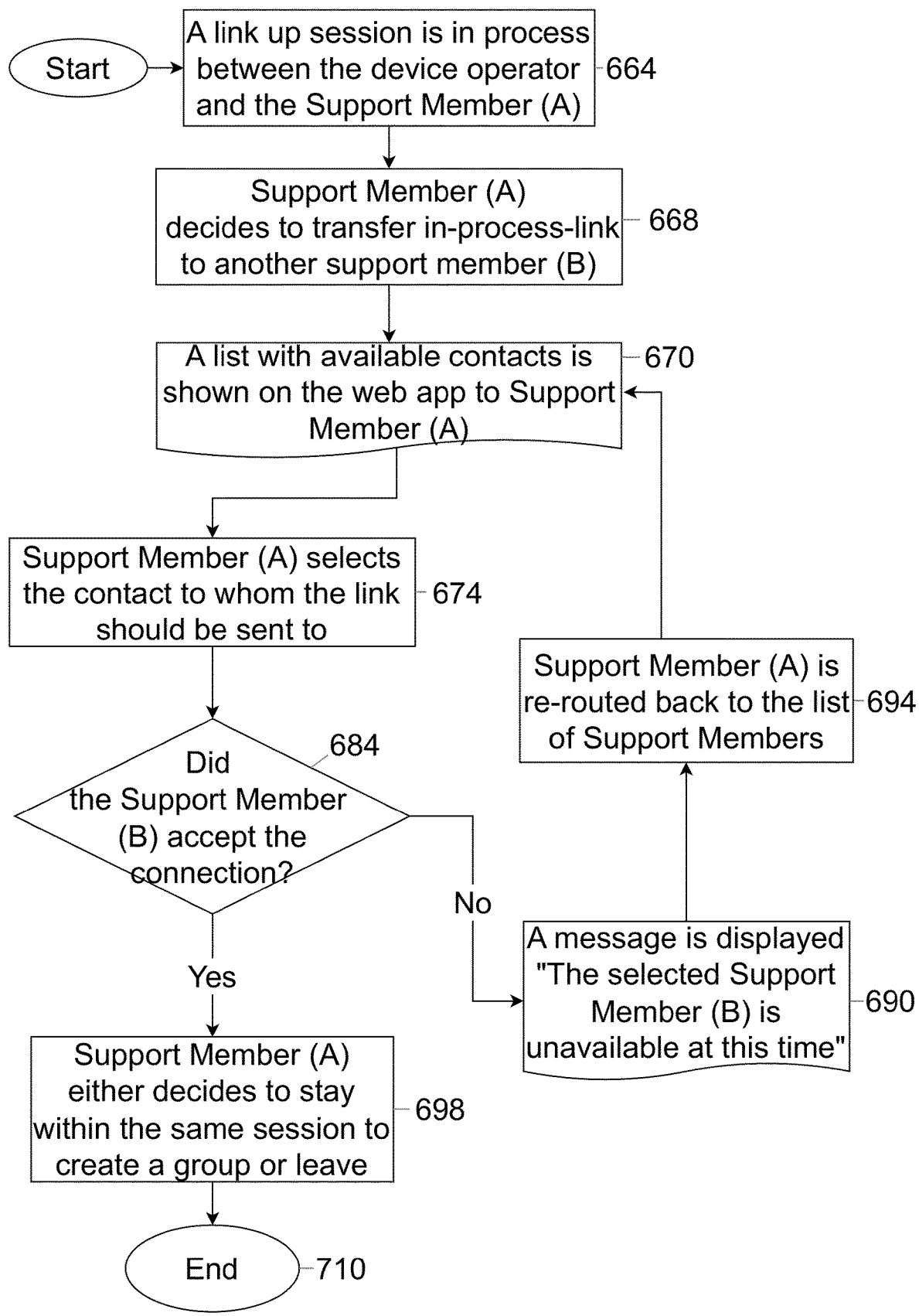
FIG. 10 is a flow diagram describing how sessions can be transferred between internal support members.

The system 10 contemplates the ability to switch an ISM or ESM 16, 18 in the middle of a session, as shown in FIG. 10. An existing session may be taking place 664 and the ISM or ESM 16, 18 may decide to transfer the active session to another ISM or ESM 668. In making that choice 668, a list of available contacts is shown to the ISM or ESM 16, 18 seeking the transfer 670. The ISM or ESM 16, 18 selects the new ISM or ESM 16, 18 that the link should be sent to for continuation of the in-progress session 674. Then the system 10 determines whether that new ISM or ESM 16, 18 that was selected at 674 is willing to accept the connection to continue the session 684. In the event that the new ISM or ESM 16, 18 did not accept the session, a message is displayed stating, "The selected Support Member is unavailable at this time" at 690. The first ISM or ESM 16, 18 seeking to transfer the session is redirected to a list of other ISMs or ESMs 694. In the event that the first ISM or ESM 16, 18 seeking to transfer the session wishes to stay within the session, he may do so in a group or leave as indicated at 698. After the aforementioned decisions, a link up session is established with the new ISM or ESM 710.

Figure 11:
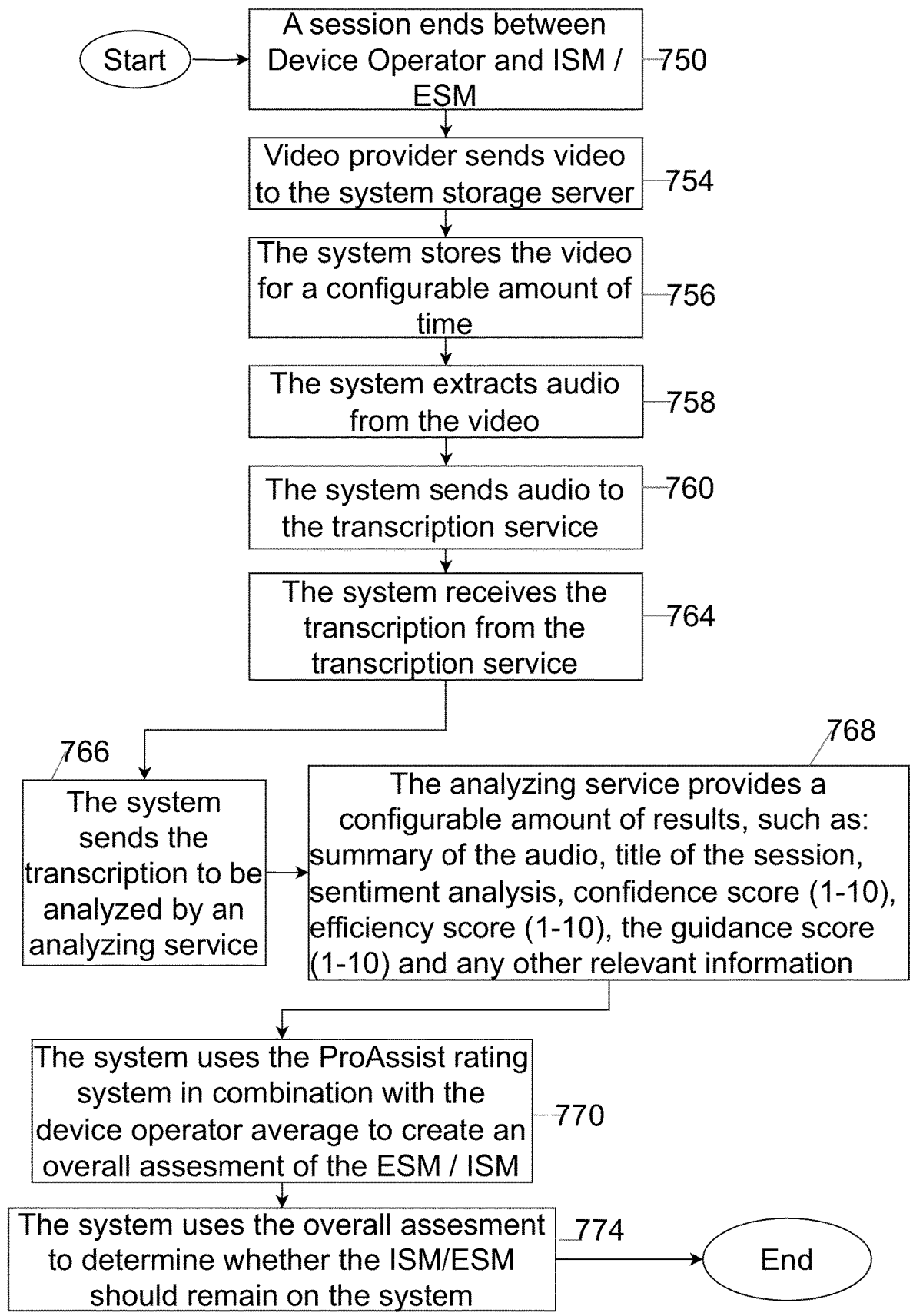
FIG. 11 describes the steps taken regarding transcribing and processing the contents of a session between a device operator and an ISM or ESM.
Figure 13:
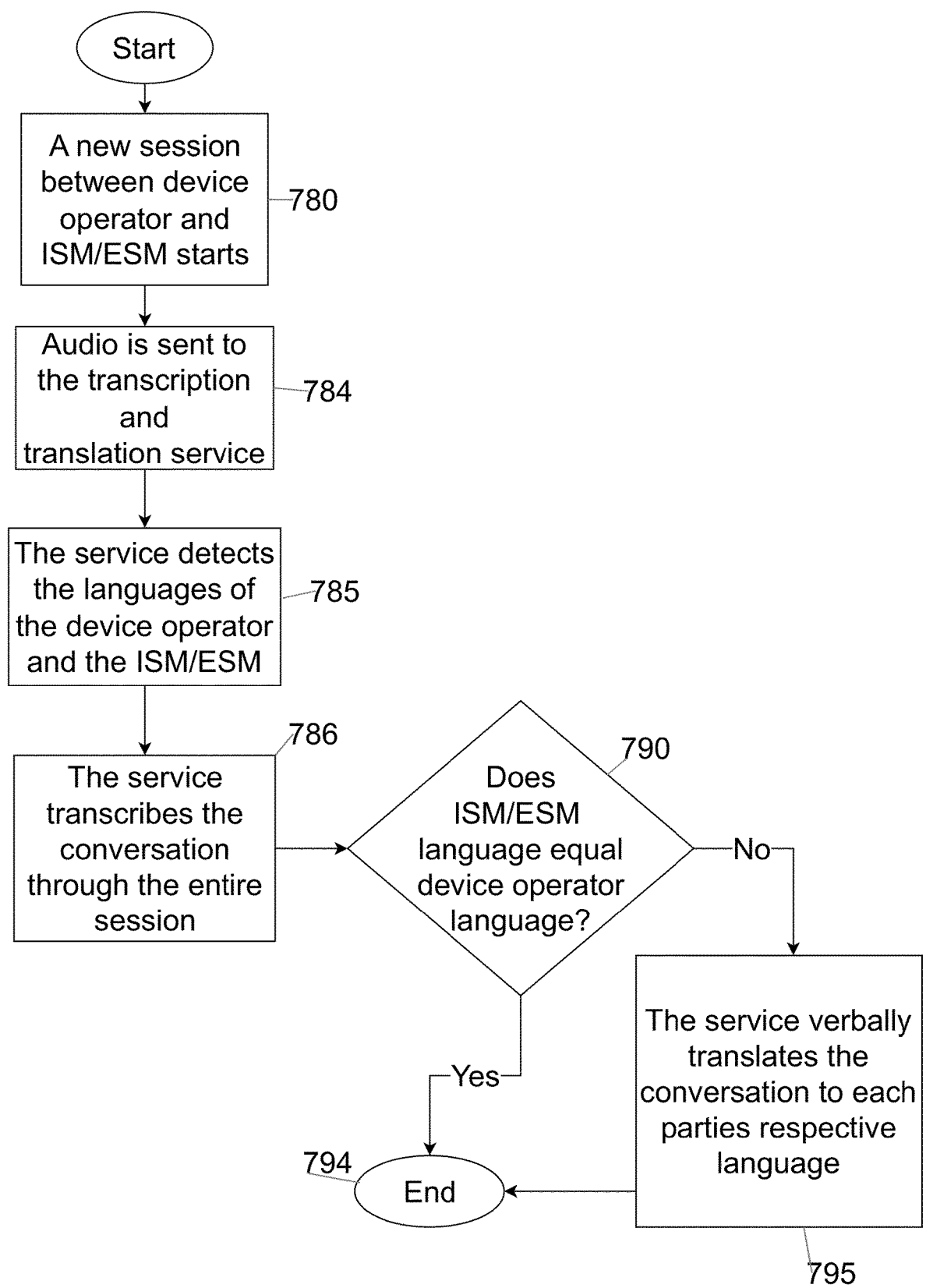
FIG. 13 lists the steps for when the device operator and the ISM or ESM may have a different language and how the system navigates translation.

FIG. 11 describes how the system 10 records information after a session ends between a device operator 14 and an ISM/ESM 16, 18. Box 750 indicates the end of a session between an ISM/ESM 16, 18. After the end of the session, video of the session is sent to a storage server 754. The server stores the video of the session as indicated at box 756 for a configurable amount of time that can be chosen for how long it is likely to be needed. The system 10 extracts audio from the video 758 and sends the audio to a transcription service 760. The transcription service 760 can be part of the providing company's 21 own servers or an external service. A transcript is made 764 and the system 10 analyzes the transcript 766. The service analyzing the transcript (which may be within the providing company 21) can provide: 1) a summary of the audio of the session between the device operator 14 and ISM/ESM 16, 18; 2) the title of the session that describes the purpose of the session and may include relevant details regarding the type of equipment serviced on a service call; 3) an analysis of the sentiment of the session that may provide an overview of the session that would negate the need to review an entire transcript or hear an entire audio file of a session; 4) provide a confidence score based on the contents of the transcript which indicates how confident the device operator 14 is with the advice he received from the ISM/ESM 16, 18 and how confident the ISM/ESM 16, 18 was during the session; or 5) any other relevant information that a user of the system 10 may want can also be recorded. This analysis of the transcript is shown at box 768. During processing of the transcript, sensitive information can be stripped from the transcript. That information could be credit card information or other banking information. After that analysis at 768, the system 10 uses the rating of the device operator 14 of the ISM/ESM 16, 18 as discussed in FIG. 8A with information derived from the analysis discussed at box 768 and above to determine an overall assessment of the ISM/ESM 16, 18, which is indicated at box 770. That overall assessment that is shown at box 770 is used to determine whether an ISM/ESM should remain in the system 10 as indicated at box 774. FIG. 13 shows the steps that may be employed when the language of the device operator 14 does not match the ISM/ESM 16, 18. Box 780 indicates a new session has begun with an ISM/ESM 16, 18. Audio of the session is sent to transcription and translation service as indicated at 784. This transcription and translation service may be within the providing company 21. It is also contemplated that the audio may be sent in real time to the transcription and translation service, but in some instances that transcription and translation may be done after the end of the session between the device operator 14 and the ISM/ESM 16, 18. The transcription and translation service detects the language of the device operator 14 and the language of the ISM/ESM 16, 18, as indicated at 785. The language of the ISM/ESM 16, 18 may also be stored in a database that retains the language of the ISM/ESM 16, 18 so that the language of the device operator 14 may be matched with the appropriate ISM/ESM 16, 18 and this is particularly important when an ISM/ESM 16,18 only speaks a single language. The translation and transcription service transcribes the conversation that occurred during the session as indicated at 786. In some cases, the language of the device operator 14 may not match that of an available ISM/ESM 16, 18. As such, the system 10 determines whether the ISM/ESM 16, 18 language is the same as the device operator 14 as indicated at 790. In the event the language is the same the process continues and ends as a session at 794. In the event the languages of the ISM/ESM 16, 18 are not the same, the system uses the translation and transcription service to translate the languages in real time as indicated at 795 so that a session may continue forward.

Figure 14:
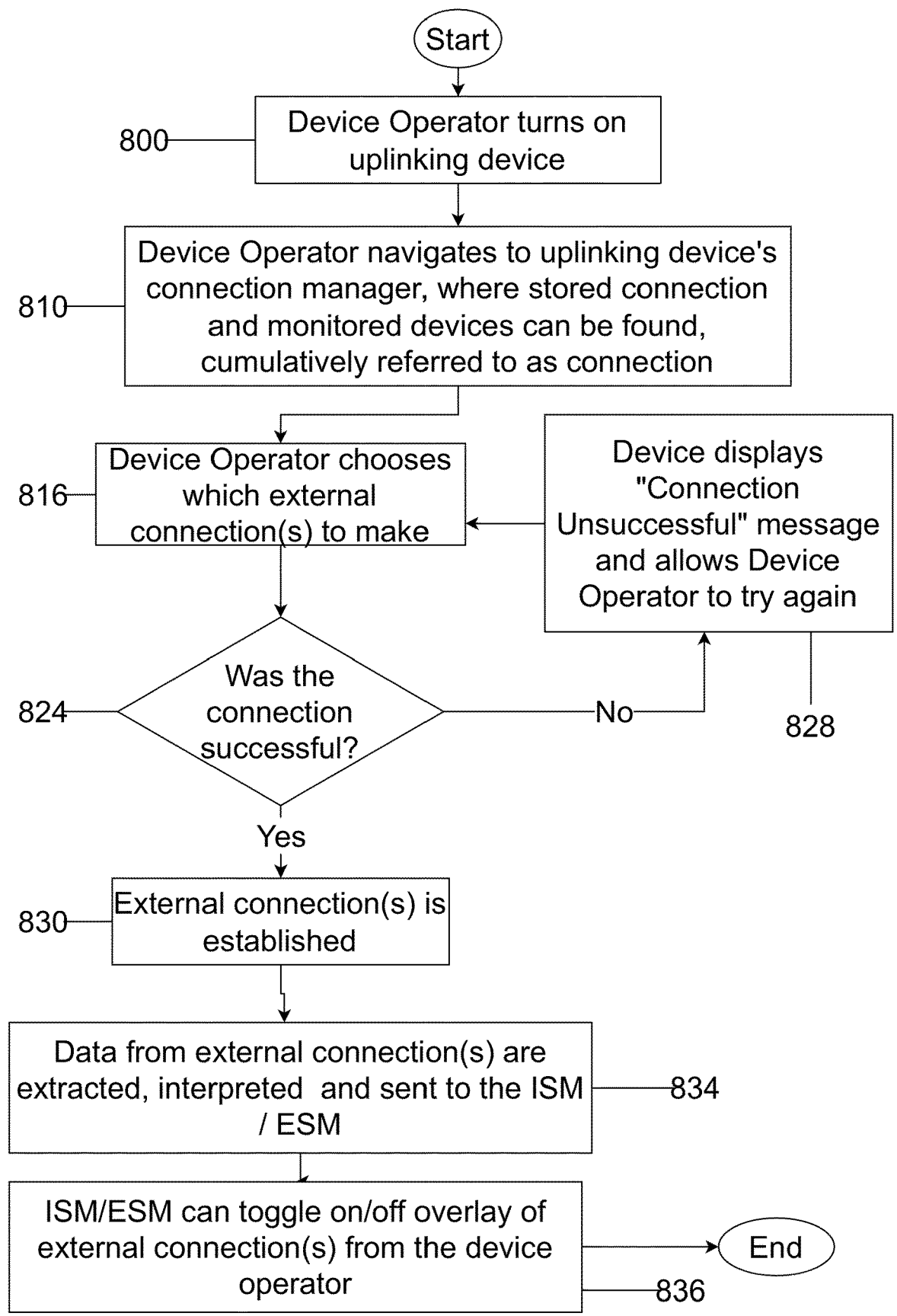
FIG. 14 shows the steps for connecting to external measuring devices using the uplinking device.

The uplinking device 28 has the capacity to connect to other connectable devices that may be tools of a particular trade. In the example of HVAC as a trade, these other connectable devices may be thermocouples, pressure sensors, electrical measuring tools that measure voltage, oms, and/or amperage. The interaction the uplinking device 28 has with other connectable devices is shown at FIG. 14. As indicated at box 800, the device operator 14 turns on the uplinking device 28. The uplinking device 28 has a connection manager which is an internal database that stores information necessary to connect to various connectable devices. The device operator 14 can navigate through a connection manager that stores information about the connectable devices 810. After navigating through the connection manager 810, the device operator 14 can chose which external connectable devices to connect to the uplinking device 28 as indicated at 816. The system 10 determines whether the connection to external connectable devices was successfully made 824. That connection is made by Bluetooth or a similar wireless connection, but it is contemplated that the uplinking device 28 may provide a direct wired connection to certain devices. In the event that the uplinking device 14 cannot make a connection to the external connectable devices, a message is displayed to the device operator 14 that the connection was unsuccessful 828 and another opportunity to connect to the external connectable devices is provided. In the event that the external connection is made to the connectable devices, it is indicated at 830. Once the connectable devices are connected, data from the external devices are extracted and interpreted onto the uplinking device 28 and also sent in real time to the ISM/ESM 16, 18 (indicated at 834) that is connected with the uplinking device 28. The uplinking device 28 has a graphical display that provides an organized real time display that lets the device operator 14 see data as it is measured. The ISM/ESM 16, 18 can toggle the graphical user interface which is an overlay on the uplinking device 28 as indicated at 836. This toggling can allow the device operator 14 to see more of an interactive video on his screen that is part of the uplinking device 28, or when it is necessary to see the information from the connectable devices, the device operator 14 can configure his view to see both the video of a session and the graphical user interface as an overlay.

Figure 15A:
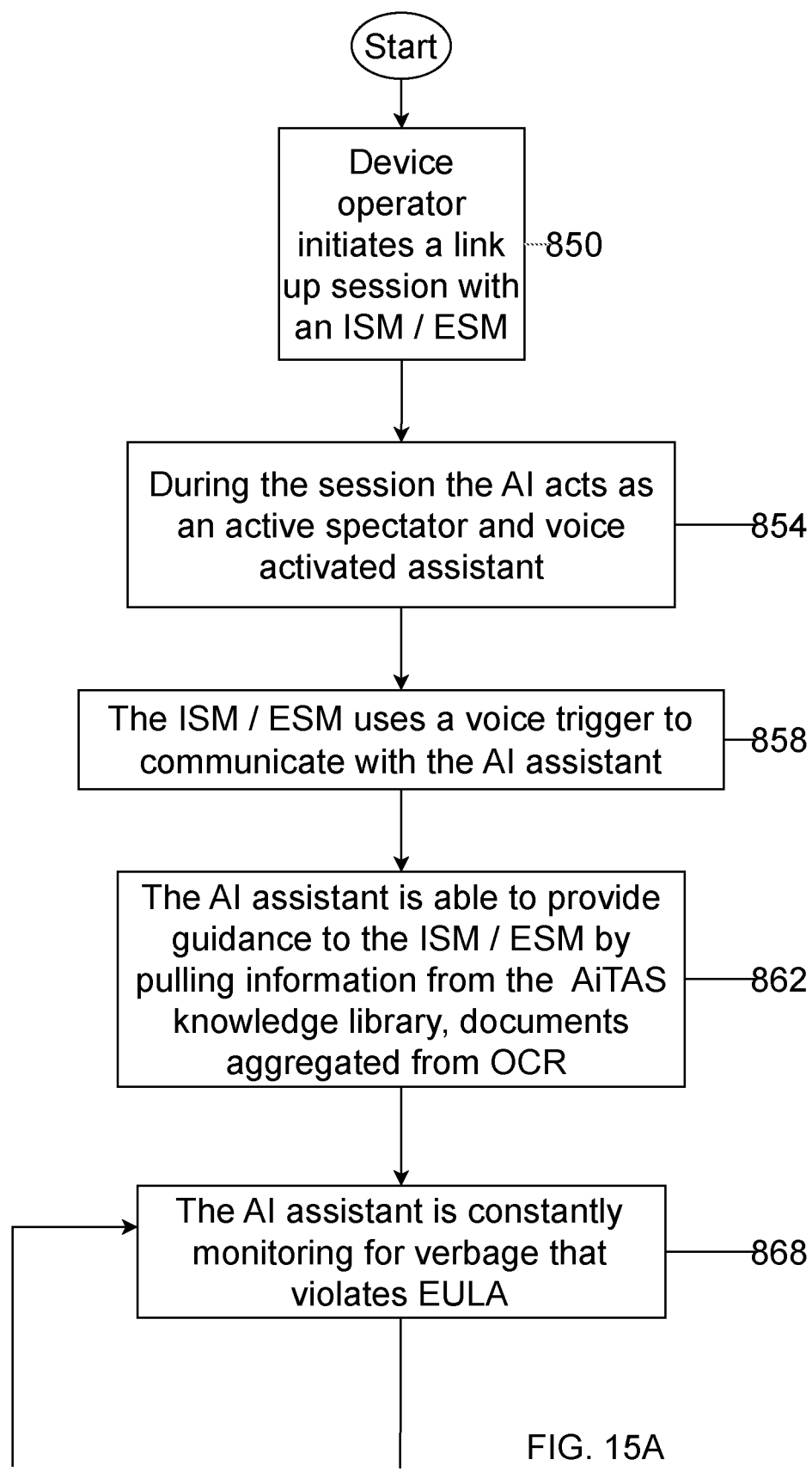
FIG. 15A is a flow diagram of a portion of the process for how the artificial intelligence system interacts with information it receives from an ISM or ESM during a session with a device operator, the broken lines indicating portions of an entire process documented over multiple FIGS.
Figure 15B:
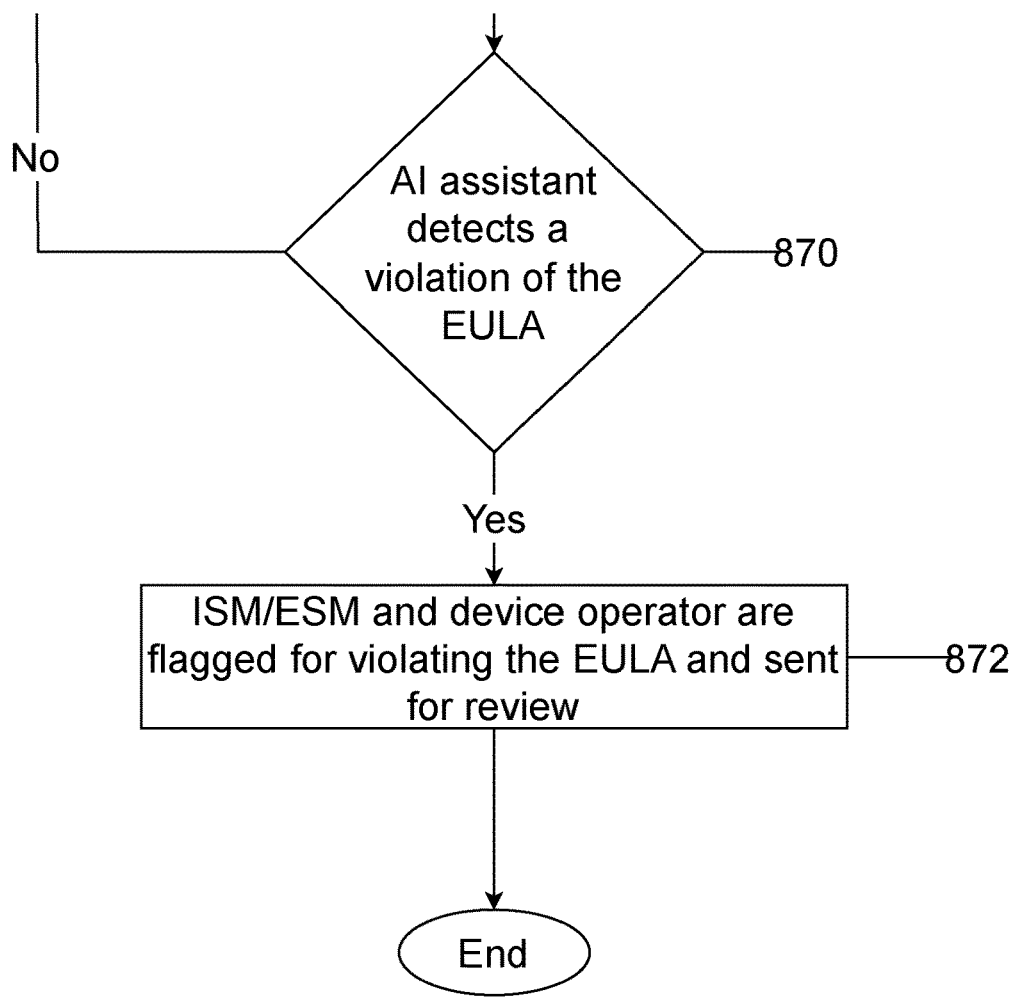
FIG. 15B is a continuation of the flow diagram of FIG. 15A on a separate page for the process of how the artificial intelligence system interacts with information it receives from an ISM or ESM during a session with a device operator, the broken lines indicating portions of an entire process documented over multiple FIGS.

FIGS. 15A and 15B describe how artificial intelligence ("AI") may be used to augment the features of the system 10 and provide the best problem-solving tool to device operators 14 acting as field technicians providing service. Box 850 indicates the start of a link up session between a device operator 14 and an ISM/ESM 16, 18. During a session between a device operator 14 and the ISM/ESM 16, 18, an AI assistant acts as an active spectator in real time and the AI assistant is voice activated by the session transmitted from the uplinking device 28 through the system 10 as indicated at 854. The ISM/ESM 16, 18 can use a voice trigger to communicate with the AI assistant 858. The AI assistant is able to provide guidance to the ISM/ESM 16, 18 to the extent he needs it. The ISM/ESM 16, 18 can choose to move forward on his own knowledge for the most familiar of tasks to him. If the ISM/ESM 16, 18 seeks more knowledge, the AI assistant is able to provide that guidance as indicated at 862. The AI assistant can draw from a significant library of information in the form of a Trusted Autonomous Systems Hub ("AI TAS"). This AI TAS maybe comprised of an open-source consortium of likeminded professionals in a particular field. The design of the system 10 contemplates integration of such AI TAS sources for a continuously updated source of information that will significantly augment the knowledge of well-vetted ISM/ESMs 16, 18 in the system. The AI assistant is also configured to detect violations of the end user license agreement ("EULA") that the providing company 21 that defines the relationship with the subscribing organization 22. For instance, the EULA will have provisions from allowing a device operator 14 to use the system to gain contact information of an ESM 18 outside of his own organization 21 so that device operator 14 may circumvent usage of the system. The AI assistant can listen for verbiage that would constitute a violation of the EULA 868. Such verbiage may include one of the people in the session providing a phone number or email. The AI assistant can decide whether a violation has occurred 870 based on its constant monitoring of the session between a device operator 14 and an ISM/ESM 16, 18. If no violation has occurred the session continues on. In the event a violation is detected, the device operator and ISM/ESM 16, 18 are flagged for a violation so that an employee of the providing company 21 may further review the saved transcript of the conversation during the session or the audio of the session as indicated at 872.

Figure 12:
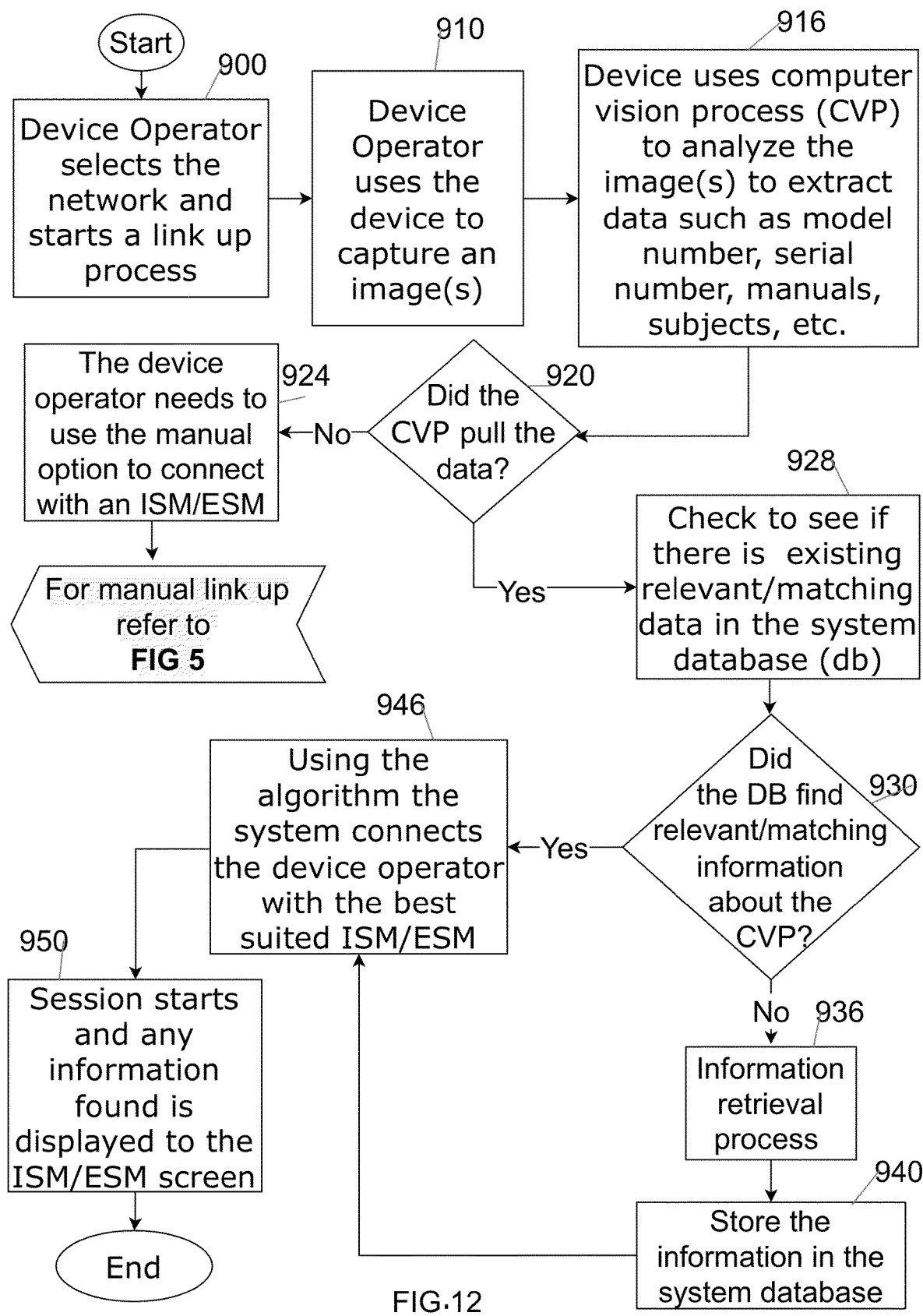
FIG. 12 describes the optical character recognition option to pull data that will be used to input information into the system.

As an automation enhancement to the system 10, it can provide quick access to assistance for particular equipment that a device operator 14 may see in the field by saving him the steps of entering information about that equipment and possibly getting that information wrong. FIG. 12 shows how this is possible. As indicated at 900 a device operator starts a session. The device operator 14 can use the camera on the uplinking device 28 to take a picture of the equipment for which he seeks advice 910. The information on a particular piece of equipment is often located in a single place that includes valuable information such as make, model number, serial number, etc. Upon taking that picture 910, that picture can be analyzed by optical character recognition ("OCR") software that recognizes the characters in the photo taken 916. It should be noted that step 916 is a useful replacement for what the device operator would otherwise have to do manually through data entry as indicated at steps 286, 363 that are shown in FIGS. 5A and 5B respectively. The system 10 can determine whether the OCR was able to pull useable data from the photo 920. In the event that the OCR did not pull the data, from the photo that the device operator 14 took 924, the device operator 14 can use the manual entry process detailed at 286, 363 of FIGS. 5A and 5B. In the event that the OCR did succeed in pulling useable data from the photo that the device operator 14 took as indicated at 928, the system can check to see if there is any matching data in the database for equipment pertaining to that information. The system 10 then compares that information to what is in the database 930 to determine whether a match is made 930. In the event that no match was found in the database, the system 10 can search the internet 936 for further information. If information is found in that search 936, that information can be stored in the system 10 database as indicated at 940 so that the information in the database will be increased and enhance future use of the system 10. The system 10 can use its algorithm to match the device user 14 with the best ISM/ESM 16, 18 based on the information it receives about the equipment for which advice is sought as indicated at 946. That information can come from the OCR recognition process 930, manual entry of the information 286, 363, or from the system 10 finding the information through an internet search 936. Once the algorithm of the system 10 has decided on the best ISM/ESM 16, 18 for the situation related to the information discussed above, a session will start 950.

The invention is not limited to the details given above, but may be modified within the scope of the following claims.

What is claimed is:

1. A network system, for providing instructions to a user seeking assistance, comprising:
   an uplinking device for sending visual and audio information across a network, said uplinking device connectable to a camera for transmitting visual information and connectable to a microphone for transmitting audio information, said uplinking device capable of searching for a network connection;
   a server located remotely from said uplinking device and connected to said network for transmitting said information over said network;
   said user inputting information regarding equipment said user seeks assistance into said uplinking device and said uplinking device transmitting said information regarding said equipment over said network to said server;
   said uplinking device displaying a graphical menu having a choice for internal support and a choice for external support;
   upon said user choosing said internal support on said graphical menu indicating said choice for said internal support, said uplinking device displaying a first option to proceed to linking up and a second option to choose an internal support member from a predetermined list of favorites, upon said user choosing said first option on said uplinking device after said user indicating said internal support, said uplinking device linking with said internal support member chosen by said server of said system, said server of said system employing an algorithm to determine a match to one of said internal support members by referring to a database within said server including information about said internal support members and said server of said system comparing said information within said database said database including information about said internal support members with said input information regarding equipment thereby filtering for said match with one of said internal support members having knowledge regarding said equipment said user inputting into said uplinking device, and upon said user choosing said second option on said uplinking device after said user indicating said internal support, said server of said system requesting an input from said user on said uplinking device choosing one of said internal support members within said predetermined list of favorites, upon said user choosing said one internal support member on said uplinking device from said predetermined list of favorites, said server of said system determining whether said one internal support member chosen on said uplinking device from said predetermined list of favorites is available, if said server of said system determines said one internal support member chosen from said predetermined list of favorites is not available, then said uplinking device of said system requesting said user choose another internal support member, on said server determining said one internal support member chosen is available, said server facilitating a connection between said one internal support member chosen and said user across said uplinking device;
   upon said user choosing external support on said graphical menu on said uplinking device, said uplinking device displaying a first option to proceed to linking up and a second option to choose an external support member from a predetermined list of favorites, upon said user choosing said first option on said uplinking device after said user indicating external support, said uplinking device linking with an external support member chosen by said server of said system, said server of said system employing an algorithm to determine a match to one of said external support members by referring to a database within said server including information about said external support members and making said match by accessing information within said database on said server and comparing said information within said database with said input information regarding said equipment thereby filtering for a match with one of said external support members having knowledge regarding said equipment said user inputting into said uplinking device, and upon said user choosing said second option on said uplinking device after said user indicating external support, said server of said system requesting an input from said user on said uplinking device choosing one of said external support members within said predetermined list of favorites, upon said user choosing said one external support member on said uplinking device from said predetermined list of favorites, said server of said system determining whether said one external support member from said predetermined list of favorites is available, if said server of said system determines said one external support member from said predetermined list of favorites is not available, then said uplinking device of said system requesting said user choose another external support member, on said server determining said one external support member chosen is available, said server facilitating a connection between said one external support member chosen and said user across said uplinking device;

upon said user linking up with one of said support members on said uplinking device, said chosen support member and said user engaging in a session using said uplinking device wherein information is exchanged, said session terminating after the exchange of said information;

upon termination of said session said user being prompted by said uplinking device to provide a rating of said support member who was engaged in said session with said user;

upon said user providing said rating on said uplinking device and said server storing said information, said rating is stored in one of said databases corresponding to said support member who was engaged in said session with said user;

said server of said system calculating an average rating of said support member who was engaged in said session with said user on said uplinking device;

said server of said system comparing said average rating of said support member who was engaged in said session with said user to a predetermined value, and said server of said system precluding said support member who was engaged in said session with said user from future sessions if said average rating falls below said predetermined value thereby automatically filtering said support members from said system upon said support members falling below said predetermined value so that said support members falling below said predetermined value are filtered from appearing on said uplinking device as available choices to any said user of said system.

2. The network system of claim 1, wherein said user is prohibited from using said uplinking device to initiate a new session until said user provides said rating of said session on said uplinking device.

3. A network system, for providing instructions to a user seeking assistance, comprising:
an uplinking device for sending visual and audio information across a network, said uplinking device connectable to a camera for transmitting visual information and connectable to a microphone for transmitting audio information, said uplinking device capable of searching for a network connection and upon finding said network connection, determining whether said camera is connected to said uplinking device and whether said microphone is connected to said uplinking device;
a server located remotely from said uplinking device and connected to said network for transmitting information over said network;

inputting information regarding equipment said user seeks assistance upon into said uplinking device and said uplinking device transmitting said information regarding said equipment over said network to said server;

said uplinking device displaying a graphical menu having a choice for internal support and a choice for external support;

upon said user choosing internal support on said graphical menu, said uplinking device displaying a first option to proceed to linking up and a second option to choose an internal support member from a predetermined list of favorites, upon said user choosing said first option on said uplinking device after said user indicating internal support, said uplinking device linking with an internal support member chosen by said server of said system, said system of said server employing an algorithm to determine a match to one of said internal support members by referring to a database within said server including information about said internal support members and said server of said system making said match by accessing information within said database on said server and comparing said information within said database on said server with said input information regarding equipment thereby filtering for a match with one of said internal support members having knowledge regarding said equipment said user input into said uplinking device, and upon said user choosing said second option on said uplinking device after said user indicating internal support, said server of said system requesting an input from said user on said uplinking device choosing one of said internal support members within said predetermined list of favorites, upon said user choosing said one internal support member on said uplinking device from said predetermined list of favorites, said server of said system determining whether said one internal support member chosen on said uplinking device from said predetermined list of favorites is available, if said server of said system determines said one internal support member chosen on said uplinking device from said predetermined list is not available, then said server of said uplinking device of said system requesting said user choose another internal support member, on said server determining said one internal support member chosen is available, said server facilitating a connection between said one internal support member chosen and said user across said uplinking device, on said server determining said one internal support member chosen is available, said server facilitating a connection between said one internal support member chosen and said user across said uplinking device;

upon said user choosing external support on said graphical menu on said uplinking device, said uplinking device displaying a first option to proceed to linking up and a second option to choose an external support member from a predetermined list of favorites, upon said user choosing said first option on said uplinking device after said user indicating external support, said uplinking device linking with an external support member chosen by said server of said system, said server of said system employing an algorithm to determine a match to one of said external support members by referring to a database within said server including information about said external support members and making said match by accessing information within said database and comparing said information within said database with said input information regarding said equipment thereby filtering for a match with one of said external support members having knowledge regarding said equipment said user input into said uplinking device, and upon said user choosing said second option on said uplinking device after said user indicating external support, said server of said system requesting an input from said user on said uplinking device choosing one of said external support members within said predetermined list of favorites, upon said user choosing said one external support member on said uplinking device from said predetermined list of favorites, said server of said system determining whether said one external support member from said predetermined list of favorites is available, if said server of said system determines said one external support member from said predetermined list of favorites is not available, then said server of said system requesting said user choose another external support member, on said server determining said one external support member chosen is available, said server facilitating a connection between said one external support member chosen and said user across said uplinking device;

upon said user linking up with one of said support members on said uplinking device, said chosen support member and said user engaging in a session using said uplinking device wherein information is exchanged said session terminating after the exchange of said information;

upon termination of said session said uplinking device prompting said user to provide a rating of said support member who was engaged in said session with said user;

upon said user providing said rating on said uplinking device and said uplinking device communicating said rating to said server, said rating is stored one of said databases on said server corresponding to said support member who was engaged in said session with said user;

said user is prohibited from using said uplinking device to initiate a new session until said user provides said rating of said session on said uplinking device;

said server of said system calculating an average rating of said support member who was engaged in said session with said user on said uplinking device;

said server of said system comparing said average rating of said support member who was engaged in said session with said user to a predetermined value, and said server of said system precluding said support member who was engaged in said session with said user from future sessions if said average rating falls below said predetermined value.

4. The network system of claim 3, wherein said camera being connected to said uplinking device and said camera being used to photograph identifying information of said equipment and said server including optical character recognition software that can translate information contained within said photograph into useable text, said server comparing said useable text compared with information within a database located on said server and said comparison with said information and said database on said server being used to select-filer for one of said support members having knowledge about said equipment to be presented on said uplinking device as a choice for said user.

5. The network system of claim 3, wherein said server takes said transmitted audio information and transcribes said audio information, said server using said transcribed audio information to assess whether said support member having engaged in said session with said user should remain as an available choice to be presented to said user upon said uplinking device.

6. The network system of claim 5, wherein said server combines said transcribed audio information with said rating of said user to determine whether said support member having engaged in said session should remain as an available choice to be presented to said user upon said uplinking device.

7. The network system of claim 5, wherein said server takes said audio information from said uplinking device and detects a language from said user; said server of said system determining whether said language from said user matches said one support member engaging in said session and upon said server determining a difference between said language of said user and said language of said support member engaging in said session translating between said languages.

8. A network system, for providing instructions to a user seeking assistance, comprising:

said user belonging to a subscribing organization and said subscribing organization contracting with a providing organization;

an uplinking device for sending visual and audio information across a network said uplinking device connectable to a camera for transmitting visual information and connectable to a microphone for transmitting audio information, said uplinking device capable of searching for a network connection and upon finding said network connection determining whether said camera is connected to said uplinking device and whether said microphone is connected to said uplinking device;

a server located remotely from said uplinking device and connected to said network for transmitting information over said network, said uplinking device making a connection with said server, said said user inputting information regarding equipment said user seeks assistance upon into said uplinking device and transmitting said information regarding said equipment over said network to said server;

said uplinking device displaying a graphical menu having a choice for internal support and a choice for external support;

upon said user choosing internal support on said graphical menu indicating said choice for internal support, said uplinking device displaying a first option to proceed to linking up and a second option to choose an internal support member belonging to said subscribing organization from a predetermined list of favorites, upon said user choosing said first option on said uplinking device after said user indicating internal support on said uplinking device, said uplinking device linking with an internal support member chosen by said server of said system, said server of said system employing an algorithm to determine a match to one of said internal support members by referring to a database within said server including information about said internal support members and said server of said system making said match by accessing information within said database including information about said internal support members and comparing said information within said database including information about said internal support members with said input information regarding equipment thereby filtering for said match with one of said internal support members having knowledge regarding said equipment said user input into uplinking device, and upon said user choosing said second option on said uplinking device after said user indicating internal support, said server of said system requesting an input from said user on said uplinking device choosing one of said internal support members within said predetermined list of favorites, upon said user choosing said one internal support member on said uplinking device from said predetermined list of favorites, said server of said system determining whether said one internal support member chosen on said uplinking device from said predetermined list of favorites is available, if said server of said system determines said one internal support member chosen from said predetermined list of favorites is not available, then uplinking device of said system requesting said user choose another internal support member, on said server determining said one internal support member chosen is available, said server facilitating a connection between said one internal support member chosen and said user across said uplinking device;

upon said user choosing external support on said graphical menu on said uplinking device, said uplinking device displaying a first option to proceed to linking up and a second option to choose an external support member belonging to an organization other than said subscribing organization from a predetermined list of favorites, upon said user choosing said first option on said uplinking device after said user indicating external support, said uplinking device linking with an external support member chosen by said server of said system, said server of said system employing an algorithm to determine a match to one of said external support members by referring to a database within said server including information about said external support members and making said match by accessing information within said database and comparing said information within said database with said input information regarding said equipment thereby filtering for a match with one of said external support members having knowledge regarding said equipment said user input into said uplinking device, and upon said user choosing said second option on said uplinking device after said user indicating external support, said server of said system requesting an input from said user on said uplinking device choosing one of said external support members within said predetermined list of favorites, upon said user choosing said one external support member on said uplinking device from said predetermined list of favorites, said server of said system determining whether said one external support member from said predetermined list of favorites is available, if said server of said system determines said one external support member from said predetermined list is not available, then said said uplinking device of said system requesting said user choose another external support member, on said server determining said one external support member chosen is available, said server facilitating a connection between said one external support member chosen and said user across said uplinking device;

said server of said system providing an option to allow said internal support members to provide support to said organizations other than said subscribing organization;

upon said user linking up with one of said support members on said uplinking device, said chosen support member and said user engaging in a session using said uplinking device wherein information is exchanged said session terminating after said exchange of information;

upon termination of said session said user being prompted by said uplinking device to provide a rating of said support member who was engaged in said session with said user on said uplinking device;

upon said user providing said rating on said uplinking device, said rating is stored in one of said databases on said server corresponding to said support member who was engaged in said session with said user on said uplinking device;

said user is precluded from using said uplinking device to initiate a new session until said user provides said rating of said session on said uplinking device;

said server of said system calculating an average rating of said support member who was engaged in said session with said user on said uplinking device;

said server of said system comparing said average rating of said support member who was engaged in said session with said user to a predetermined value, and said server of said system precluding said support member who was engaged in said session with said user on said uplinking device if said average rating falls below said predetermined value.

9. The network system of claim 8, wherein said camera being connected to said uplinking device and said camera being used to photograph identifying information of said equipment and said server including optical character recognition software that can translate information contained within said photograph into useable text, said server comparing said useable text compared with information within a database located on said server and said comparison with said information and said database being used to filer for one of said support members on said uplinking device.

10. The network system of claim 8, wherein said server takes said transmitted audio information and transcribes said audio information, said transcribed audio information being used to assess whether said support member having engaged in said session with said user should remain within said network system.

11. The network system of claim 10, wherein said server combines said transcribed audio information with said rating of said user to determine whether said support member having engaged in said session should remain within said network system.

12. The network system of claim 10, wherein said system takes said audio information and detects a language from said device operator; said system determining whether said language from said user matches said one support member engaging in said session and upon determining a difference between said language of said user and said language of said support member engaging in said session translating between said languages.

* * * * *